US008831165B2

(12) United States Patent
Toishigawa et al.

(10) Patent No.: US 8,831,165 B2
(45) Date of Patent: Sep. 9, 2014

(54) FUEL ASSEMBLY

(75) Inventors: Akiko Toishigawa, Yokohama (JP); Daisuke Goto, Kamakura (JP)

(73) Assignee: Global Nuclear Fuel—Japan Co., Ltd., Kanagawa-Ken (JP)

( * ) Notice: Subject to any disclaimer, the term of this patent is extended or adjusted under 35 U.S.C. 154(b) by 728 days.

(21) Appl. No.: 12/978,171

(22) Filed: Dec. 23, 2010

(65) Prior Publication Data

US 2011/0158375 A1 Jun. 30, 2011

(30) Foreign Application Priority Data

Dec. 25, 2009 (JP) .................................. 2009-295656
May 18, 2010 (JP) .................................. 2010-114539

(51) Int. Cl.
| | | |
|---|---|---|
| *G21C 3/34* | (2006.01) | |
| *G21C 3/32* | (2006.01) | |
| *G21C 3/328* | (2006.01) | |
| *G21C 3/04* | (2006.01) | |
| *G21C 3/00* | (2006.01) | |

(52) U.S. Cl.
CPC .. *G21C 3/32* (2013.01); *G21C 3/04* (2013.01); *G21C 3/00* (2013.01); *G21C 3/328* (2013.01); *Y02E 30/38* (2013.01)
USPC .......................................................... 376/438

(58) Field of Classification Search
CPC ............ G21C 3/04; G21C 3/00; Y02E 30/40; G21Y 2004/30; G21Y 2002/201
USPC .......................................................... 376/438
See application file for complete search history.

(56) References Cited

U.S. PATENT DOCUMENTS

| | | | | |
|---|---|---|---|---|
| 4,123,328 A | * | 10/1978 | Radkowsky et al. | 376/350 |
| 4,585,614 A | | 4/1986 | Helmersson | 376/434 |
| 5,299,244 A | | 3/1994 | Yamauchi et al. | 376/438 |

FOREIGN PATENT DOCUMENTS

| | | |
|---|---|---|
| EP | 0 099 322 A2 | 1/1984 |
| GB | 1186162 | 4/1970 |
| GB | 1 528 267 | 10/1978 |
| JP | 04-143694 | 5/1992 |
| JP | 5-27066 A | 2/1993 |
| JP | 2009-145203 | 7/2009 |

OTHER PUBLICATIONS

Extended European Search Report, for European Application No. 10196561.4, dated May 20, 2011, 6 pages.

* cited by examiner

*Primary Examiner* — Frank J McGue
(74) *Attorney, Agent, or Firm* — Seed IP Law Group PLLC

(57) ABSTRACT

A fuel assembly has a regular dodecagon fuel rod arrangement with a single fuel rod provided to each apex of a regular dodecagon having lines of length A. Assuming a direction within a horizontal plane is transverse, and a direction perpendicular to the transverse direction is longitudinal, regular dodecagon fuel rod arrangements are arranged in regular intervals in the transverse direction and the longitudinal direction. In the transverse direction, two adjacent regular dodecagon fuel rod arrangements are arranged having opposing two sides of the regular dodecagons parallel to each other with the distance of mA, wherein m is a nonnegative integer, apart from each other. With respect to the longitudinal direction, two adjacent regular dodecagon fuel rod arrangements are arranged so that the opposing two sides of the regular dodecagons are parallel to each other with the distance of nA, wherein n is a nonnegative integer, apart from each other.

10 Claims, 19 Drawing Sheets

FUEL ASSEMBLY

CROSS-REFERENCE TO RELATED APPLICATIONS

This application claims the benefit under 35 U.S.C. §119(a) of Japanese Patent Application No. 2009-295656, filed on Dec. 25, 2009, and Japanese Patent Application No. 2010-114539 filed on May 18, 2010, the entire contents of which are incorporated herein by reference.

BACKGROUND

1. Technical Field

The present disclosure relates to a fuel assembly, and in particular, relates to a fuel assembly having a particular fuel rod arrangement.

2. Description of the Related Art

In general, a fuel assembly for a light water reactor is formed by bundling a plurality of fuel rods having a number of fuel pellets, such as uranium oxide filled into fuel canning pipes, and one or several pieces of water rods parallel to each other with a spacer and surrounding the outer circumference with a channel box.

In the related art, a fuel assembly in which fuel rods are arranged to be square-shaped has been widely used.

FIG. 20 is a plane sectional view of a fuel assembly having fuel rod arrangements that is square grid-shaped in the related art. Numeral 20 indicates the entire fuel assembly. Numerals 21, 22 and 23 respectively indicate a fuel rod, a channel box and a water rod.

As illustrated in FIG. 20, the fuel assembly 20 includes a fuel rod arrangement of eleven rows by eleven columns. The fuel rods 21 are provided at apexes of regular tetragons arranged to be square grid-shaped. The water rod 23 is arranged on a diagonal line from the corner of the channel box 22 that is closest to a control rod (not illustrated) to the opposing corner.

Further, in the related art, there has also been proposed a fuel assembly that includes a fuel rod arrangement having the mentioned square grid that is rotated by 45 degrees against one side of the channel box.

Recently, demand for enhancing efficiency of a reactor has been strengthened. To address this issue, from a viewpoint that fuel economy can be improved by further enlarging energy extracting from each fuel assembly, it has been attempted to load a larger number of fuel rods into one fuel assembly.

Further, also from a viewpoint of waste amount reduction, it is preferable that the number of fuel rods accommodated by one fuel assembly is large in order to reduce the waste amount.

Accordingly, when designing a fuel assembly for a boiling-water reactor (BWR) in the related art, there has been a tendency that the number of fuel rods accommodated in the channel box is increased to be eight rows by eight columns, nine rows by nine columns and ten rows by ten columns (see Japanese Patent Application Laid-open (JP-A) No. 2009-145203).

Regarding the arrangement of fuel rods, arranging fuel rods to be square grid-shaped constituted with rows and columns parallel to sides of a channel box or arranging fuel rods is a conventional fuel assembly. Further, a conventional fuel assembly that rotates the square grid against one side of a channel box by 45 degrees has been a basic arrangement in the related art.

Both of the above fuel rod arrangements are fuel rod arrangements of a square grid. It may be generally perceived that almost every practical fuel rod arrangement has been a fuel rod arrangement of a square grid in the related art. It has been favorable with the fuel rod arrangement having the square grid-shaped arrangement that is parallel to the sides of the channel box against an insertion position of a control rod or the fuel rod arrangement having the square grid rotated against one side of the channel box by 45 degrees because of the way that the fuel assembly advances in the reactor for combustion. With respect to combustion, the fuel assembly advances symmetrically against a diagonal line connecting a corner of the channel box that is close to the center of the control rod and a diagonal corner opposing thereto (hereinafter, merely called the diagonal line when apparent) in relation to the control rod. Here, diagonal symmetry of fuel denotes that fuel is arranged symmetrically against the diagonal line of the channel box as described herein. In the case that the diagonal symmetry of fuel is satisfied, an even burnup can be actualized within the fuel assembly, so that soundness and economy of fuel can be further improved.

However, with the fuel rod arrangement that is square grid-shaped, the distance between the fuel rods located on adjacent apexes of the regular tetragon cannot be lessened than a determined distance due to soundness, while the distance between the fuel rods located on the diagonal line is inevitably longer than the distance between the fuel rods at the adjacent apexes. Accordingly, there has been a limitation of the number of fuel rods that can be accommodated by one fuel assembly.

Meanwhile, as disclosed in JP-A No. 1992-143694, a fuel rod arrangement having all fuel rods provided at apexes of regular triangles has been proposed solely for the purpose of increasing the number of fuel rods in a fuel assembly.

With the fuel rod arrangement having fuel rods arranged to be regular triangle grid-shaped, the respective distances between all of the fuel rods is equalized and each distance between the fuel rods can be shortened. Accordingly, the fuel rods can be arranged at a higher density.

However, as can be seen from the drawings of JP-A No. 1992-143694, the fuel rod arrangement that is regular triangle grid-shaped is not a symmetric arrangement against the diagonal line of the channel box. That is, when the fuel rods are arranged in a triangle grid-shaped arrangement, absolute diagonal symmetry of fuel cannot be actualized.

Further, as shown in the related art of FIG. 20, a water rod 23 has been provided into a fuel assembly for the purpose of planarization of output distribution of the fuel assembly, improvement of the reactivity, and improvement of the void reactivity coefficient.

BRIEF SUMMARY

In an embodiment of the present disclosure, a regular dodecagon fuel rod arrangement in which a fuel rod is provided at each apex of the regular dodecagon is adopted as a basic unit to arrange fuel rods within a fuel assembly, and then, the regular dodecagon fuel rod arrangements are arranged being apart respectively by a determined distance along the transverse direction and the longitudinal direction. Here, the terms of arranging the regular dodecagon fuel rod arrangements as being apart by the determined distance include arranging to connect two adjacent regular dodecagon fuel rod arrangements so as to share one side of the regular dodecagon at the portion that is adjacent each other.

In a fuel assembly according to an embodiment of the present disclosure, a plurality of fuel rods are supported vertically and the outer circumference thereof is surrounded by a channel box. The fuel assembly has a regular dodecagon fuel rod arrangement in which a single fuel rod is provided at each apex of the regular dodecagon having sides of length A as viewing from above the fuel assembly in the vertical direction. The plurality of regular dodecagon fuel rod arrangements are arranged in regular intervals respectively in the transverse direction and the longitudinal direction establishing that one direction within a horizontal plane is the transverse direction and a direction perpendicular to the transverse direction is the longitudinal direction. Two of the regular dodecagon fuel rod arrangements adjacent in the transverse direction are arranged so that opposing two sides of the regular dodecagons are parallel and apart by a first distance mA (here, m is a nonnegative integer). Two of the regular dodecagon fuel rod arrangements adjacent in the longitudinal direction are arranged so that opposing two sides of the regular dodecagons are parallel and apart by a second distance nA (here, n is a nonnegative integer).

A fuel assembly may be summarized as including a plurality of fuel rods supported vertically; and a channel box surrounding the outer circumference of the plurality of fuel rods; the fuel assembly having a plurality of regular dodecagon fuel rod arrangements, wherein a single fuel rod of the plurality of fuel rods is provided at each apex of each regular dodecagon, wherein each side of the regular dodecagon has length A; the plurality of regular dodecagon fuel rod arrangements being arranged in regular intervals respectively in a transverse direction and a longitudinal direction, the transverse direction perpendicular to the longitudinal direction; a first two regular dodecagon fuel rod arrangements of the plurality of regular dodecagon fuel rod arrangements adjacent in the transverse direction and arranged with two opposing sides of the first two regular dodecagons in parallel and apart by a first distance mA, wherein m is a non-negative integer; and a second two regular dodecagon fuel rod arrangements of the plurality of regular dodecagon fuel rod arrangements adjacent in the longitudinal direction and arranged with two opposing sides of the second two regular dodecagons in parallel and apart by a second distance nA, wherein n is a non-negative integer.

According to an embodiment, a diagonal line is formed from a first corner of the channel box to a second corner of the channel box, the second corner being a corner of the channel box furthest from the first corner, the first corner being a corner of the channel box closest to a control rod. Also either the transverse direction or the longitudinal direction is parallel to the diagonal line, and the plurality of regular dodecagon fuel rod arrangements are arranged symmetrically against the diagonal line.

According to an embodiment, a row of the plurality of regular dodecagon fuel rod arrangements is aligned in either the transverse direction or the longitudinal direction on the diagonal line.

According to an embodiment, rows of the plurality of regular dodecagon fuel rod arrangements are aligned in either the transverse direction or the longitudinal direction and arranged symmetrically sandwiching the diagonal line.

According to an embodiment, either the transverse direction or the longitudinal direction is substantially parallel to a side of the channel box. Further, the plurality of regular dodecagon fuel rod arrangements are arranged symmetrically against a diagonal line, the diagonal line connecting a corner of the channel box closest to a control rod and a diagonal corner of the channel box furthest from the corner of the channel box closest to a control rod.

According to an embodiment, the plurality of regular dodecagon fuel rod arrangements are further arranged symmetrically against a line connecting midpoints of opposing sides of the channel box.

According to an embodiment, at least one of the plurality of regular dodecagon fuel rod arrangements includes, at the inside thereof, a regular hexagon fuel rod arrangement in which a single fuel rod of the plurality of fuel rods is provided at each apex of the regular hexagon. In addition, each side of the regular hexagon has length A, and each side of the regular hexagon is parallel to a corresponding side of the regular dodecagon.

According to an embodiment, the regular hexagon fuel rod arrangement includes a fuel rod of the plurality of fuel rods at the center of the regular hexagon.

According to an embodiment, the regular hexagon fuel rod arrangement includes a water rod at the center of the regular hexagon.

According to an embodiment, a determined regular dodecagon fuel rod arrangement among the plurality of regular dodecagon fuel rod arrangements includes a water rod at the center of the determined regular dodecagon.

According to an embodiment, a determined regular dodecagon fuel rod arrangement position among the plurality of regular dodecagon fuel rod arrangements is occupied by a water rod.

According to an embodiment, at least one of the plurality of regular dodecagon fuel rod arrangements includes, at the inside thereof, a regular tetragon fuel rod arrangement in which a single fuel rod of the plurality of fuel rods is provided at each apex of the regular tetragon. In addition, each apex of the regular tetragon is located at a vertex of a regular triangle, the regular triangle having as the base one of every three sides of the regular dodecagon.

According to an embodiment, the regular tetragon fuel rod arrangement includes a fuel rod of the plurality of fuel rods at the center of the regular tetragon.

According to an embodiment, a determined regular tetragon fuel rod arrangement includes a water rod at the center of the regular tetragon.

According to an embodiment, a determined regular dodecagon fuel rod arrangement among the plurality of regular dodecagon fuel rod arrangements is configured with a single short fuel rod at each apex of the regular dodecagon. The determined regular dodecagon fuel rod arrangement includes a water rod at the inside thereof, and the water rod has a diameter corresponding to the determined regular dodecagon fuel rod arrangement at a fuel upper portion.

According to an embodiment, the fuel assembly also includes one or more fuel rods within the channel box, the one or more fuel rods not formed on the apex of one of the plurality of regular dodecagon fuel rod arrangements

BRIEF DESCRIPTION OF THE SEVERAL VIEWS OF THE DRAWINGS

Non-limiting and non-exhaustive embodiments are described with reference to the following drawings, wherein identical or analogous components or modules are indicated with the same reference numbers throughout the various views unless otherwise specified. The relative positions of elements in the drawings are not necessarily drawn to scale. For example, the various elements may be connected as illustrated, connected in other ways, and connected with other intervening elements. The particular elements of the figures have been selected for ease of recognition in the drawings.

One or more embodiments are described hereinafter with reference to the accompanying drawings.

DETAILED DESCRIPTION

Embodiments described in the present disclosure provide a fuel assembly capable of increasing the number of fuel rods loaded to one fuel assembly compared to the conventional fuel rod arrangement that is square grid-shaped. Fuel assembly embodiments described in the present disclosure provide substantially diagonal symmetry of fuel.

When some fuel rods of a square grid in the square grid-shaped fuel rod arrangement of the related art are replaced with a water rod, the distances from the water rod to each surrounding fuel rod is not completely even. Therefore, there has been a problem that the effects of the water rod vary with fuel rods.

Embodiments described in the present disclosure provide a fuel assembly capable of increasing the number of fuel rods loaded into one fuel assembly as described herein. Embodiments described in the present disclosure arrange a water rod so that the distances from the water rod to surrounding fuel rods are substantially even.

Hereafter, three embodiments according to the present disclosure will be described. In the first embodiment, a fuel assembly has regular dodecagon fuel rod arrangements arranged respectively in the transverse direction and the longitudinal direction. In a fuel assembly of the second embodiment, a determined fuel rod of the fuel assembly according to the first embodiment is replaced with a water rod. In a third embodiment, a fuel assembly adopts a fuel rod arrangement according to the present disclosure for a next generation channel box, which is larger than a current one.

Figure 1:
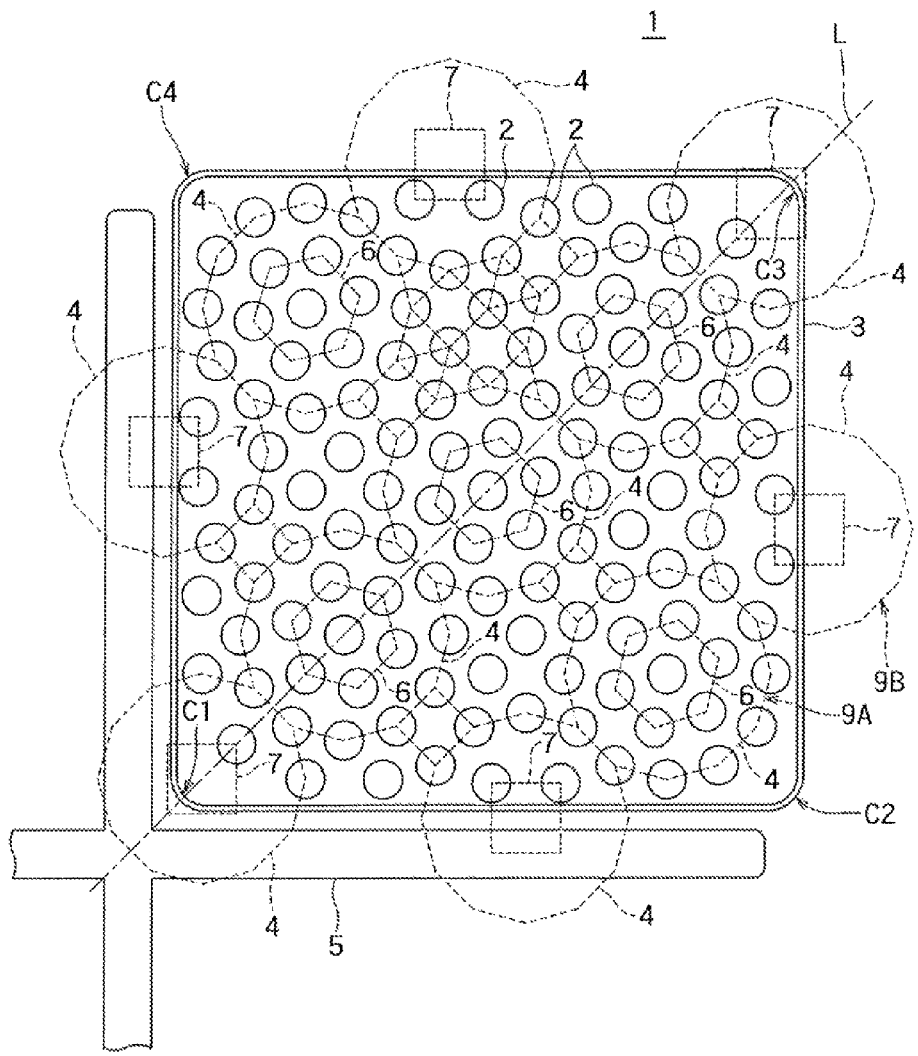
FIG. 1 is a plane sectional view of a fuel assembly (m=0, n=1) having a fuel rod arrangement according to a first embodiment.

FIG. 1 illustrates a plane sectional view of a fuel assembly according to the first embodiment of the present disclosure viewing from above in the vertical direction.

In a fuel assembly 1 according to the present embodiment, a plurality of fuel rods 2 is vertically supported, and the outer circumference thereof is surrounded by a channel box 3.

As illustrated in FIG. 1, the fuel assembly 1 of the present embodiment has a regular dodecagon fuel rod arrangement 4 being a fuel rod arrangement in which a single fuel rod 2 is provided at each apex of the regular dodecagon when viewed from above in the vertical direction. In FIG. 1, the regular dodecagon fuel rod arrangements 4 are illustrated with regular dodecagons of auxiliary lines. The length of each side of the regular dodecagon is a uniform distance, A.

Further, in FIG. 1, one corner C1 of the channel box 3 is arranged closest to a control rod 5. Here, the present fuel assembly satisfies diagonal symmetry against both a diagonal line passing through corners C1, C3 and a diagonal line passing through corners C2, C4. Accordingly, the corner arranged closest to the control rod 5 is not limited to the corner C1, so that any of the corners C2, C3, C4 may be possible.

Here, it is assumed that one direction within a horizontal plane is a transverse direction and a direction perpendicular to the transverse direction is a longitudinal direction. In the disclosure, unless otherwise specified, the transverse direction is the direction that is parallel to a line connecting the corner of the channel box closest to the control rod and the diagonal corner thereof (i.e., the diagonal line L in FIG. 1), and the longitudinal direction is the direction perpendicular to the transverse direction.

As illustrated in FIG. 1, a plurality of regular dodecagon fuel rod arrangements 4 are arranged in regular intervals respectively in the transverse direction and the longitudinal direction. In the fuel assembly of the present disclosure, two regular dodecagon fuel rod arrangements adjacent in the transverse direction are arranged so that the opposing two sides of the regular dodecagons are parallel to each other and apart by a first distance mA, wherein m is a nonnegative integer. Meanwhile, two regular dodecagon fuel rod arrangements adjacent in the longitudinal direction are arranged so that the opposing two sides of the regular dodecagons are parallel to each other and apart by a second distance nA, wherein n is a nonnegative integer.

In the present embodiment illustrated in FIG. 1, two regular dodecagon fuel rod arrangements 4 adjacent in the transverse direction are connected so as to share one side of the regular dodecagon at the portions that are adjacent to each other. That is, the first distance mA between the opposing two sides of the regular dodecagons of the two regular dodecagon fuel rod arrangements that are adjacent in the transverse direction is zero (i.e., m=0).

Meanwhile, two regular dodecagon fuel rod arrangements 4 adjacent in the longitudinal direction are arranged so that the opposing two sides of the regular dodecagons are parallel to each other and apart by the distance equal to the length of A of one side of the regular dodecagon. That is, the second distance nA between the opposing two sides of the regular dodecagons of the two dodecagon fuel rod arrangements that are adjacent in the longitudinal direction is A (i.e., n=1).

As illustrated in FIG. 1, the fuel assembly 1 includes 129 pieces of the fuel rods 2. This is eight pieces more than 121 (=11×11) pieces, which is the number of fuel rods 2 included in a fuel assembly having the fuel rods 2 arranged within the channel box 3 that is square grid-shaped (hereinafter, called 11×11 fuel assembly).

Further, as illustrated in FIG. 1, the regular dodecagon fuel rod arrangements 4 arranged in the transverse direction and the longitudinal direction are arranged and rotated by 45 degrees from one side of the channel box 3 as a whole.

As illustrated in FIG. 1, the fuel rods 2 are further arranged at the inside of the respective regular dodecagon fuel rod arrangements 4. The regular dodecagon fuel rod arrangements 4 which are completely arranged within the fuel assembly 1 respectively include, at the inside thereof, a regular hexagon fuel rod arrangement 6 that is a fuel rod arrangement in which a single fuel rod is provided at each apex of the regular hexagon. In FIG. 1, the regular hexagon fuel rod arrangements 6 are illustrated with regular hexagons of auxiliary lines.

Meanwhile, the regular dodecagon fuel rod arrangements 4 which are partially arranged within the fuel assembly 1 respectively include, at the inside thereof, a regular tetragon fuel rod arrangement 7 that is a fuel rod arrangement in which a single fuel rod is provided at each apex of the regular tetragon. In FIG. 1, the regular tetragon fuel rod arrangements 7 are illustrated with regular tetragons of auxiliary lines.

Here, in the example of FIG. 1, since a part of the respective regular dodecagon fuel rod arrangements 4 at the circumferential area of the fuel assembly 1 is located outside the channel box 3, the regular dodecagon is incomplete. However, the concept of the fuel rod arrangement (i.e., the arrangement positions of the fuel rods) is exactly the same as that in the case of the regular dodecagon fuel rod arrangement 4 having the complete regular dodecagon.

Further, in the example of FIG. 1, only the regular dodecagon fuel rod arrangements 4 at the circumferential area have the regular tetragon fuel rod arrangement 7 respectively. Since a part of the regular tetragon fuel rod arrangement 7 is located outside the channel box 3, the regular tetragon is incomplete. However, the concept of the fuel rod arrangements (i.e., the arrangement positions of the fuel rods) for the incomplete regular tetragons is the same as that in the case of the regular tetragon fuel rod arrangement 7 that has the complete regular tetragon. Here, not limited to the arrangement only at the circumferential area of the fuel assembly as the example of FIG. 1, the regular tetragon fuel rod arrangements 7 may be arranged at the entire fuel assembly. That is, instead of the regular hexagon fuel rod arrangements 6, the regular tetragon fuel rod arrangements 7 may be arranged at the inside of the regular dodecagon fuel rod arrangements 4 which are completely included within the fuel assembly 1.

Next, it will be described that both the increased loading number of the fuel rods for the fuel assembly and the diagonal symmetry of fuel can be satisfied with the fuel rod arrangement unit according to the present disclosure with reference to FIG. 2.

Figure 2A:
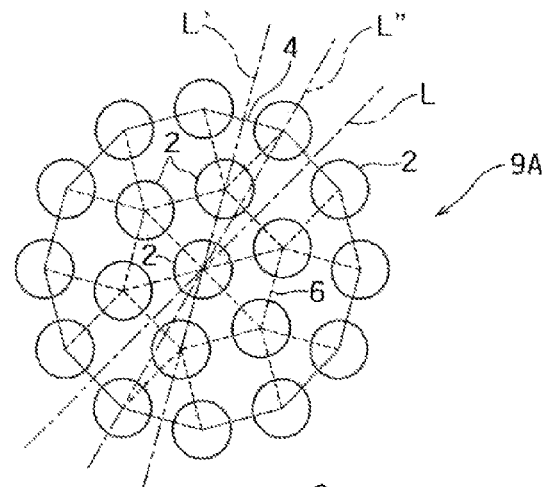
FIG. 2(a) is a plane sectional view of a fuel rod arrangement unit embodiment having a regular dodecagon fuel rod arrangement and a regular hexagon fuel rod arrangement arranged at the inside thereof.
Figure 2B:
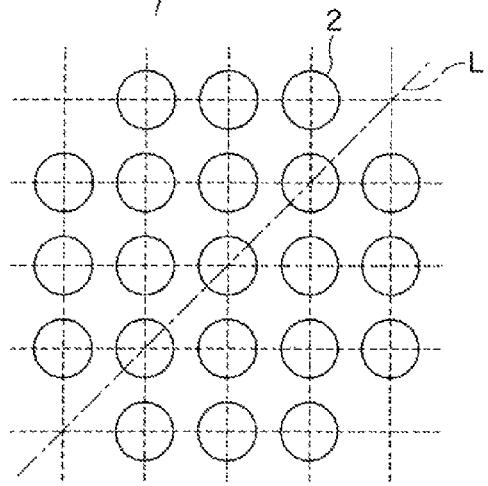
FIG. 2(b) is a plane sectional view of fuel rods arranged being square grid-shaped in the related art.
Figure 2C:
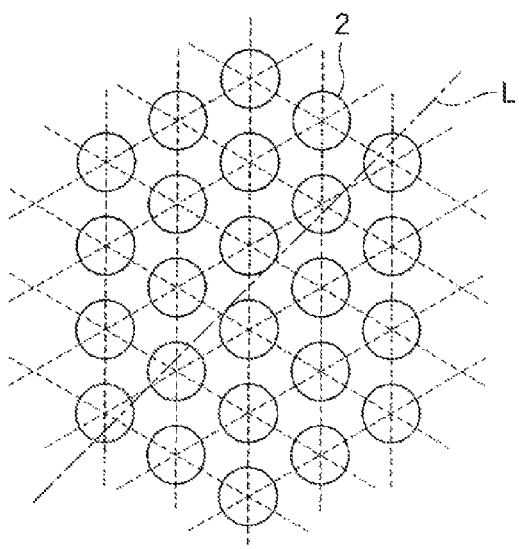
FIG. 2(c) is a plane sectional view of fuel rods arranged being regular triangle grid-shaped in the related art.

FIG. 2(a) illustrates a fuel rod arrangement unit 9A having the regular dodecagon fuel rod arrangement 4 and the regular hexagon fuel rod arrangement 6 therein so as to be a unit to arrange fuel rods in the fuel assembly. FIG. 2(b) illustrates a fuel rod arrangement that is square grid-shaped. FIG. 2(c) illustrates a fuel rod arrangement that is regular triangle grid-shaped.

As illustrated in FIG. 2(a), the fuel rod arrangement unit 9A includes the regular dodecagon fuel rod arrangement 4 in which a single fuel rod 2 is provided at each apex of the regular dodecagon and the regular hexagon fuel rod arrangement 6 in which a single fuel rod 2 is provided at each apex of the regular hexagon at the inside of the regular dodecagon fuel rod arrangement 4. Further, a single fuel rod is provided at the center of the regular hexagon of the regular hexagon fuel rod arrangement, that is, at a position of an intersection point of diagonal lines connecting opposing apexes of the regular hexagon.

As can be seen from FIG. 2(a), each side of the regular hexagon of the regular hexagon fuel rod arrangement 6 has the same length as the side of the regular dodecagon of the regular dodecagon fuel rod arrangement 4 and is parallel thereto. That is, the angle (i.e., the direction) of the regular hexagon within the regular dodecagon is determined due to being parallel to the side of the regular dodecagon, and then, the distance in the radial direction is determined due to being the same length of each side of the regular hexagon as the side of the regular dodecagon. Therefore, provided that the regular dodecagon is determined, the regular hexagon at the inside thereof is determined with substantial accuracy.

Positional relation between the regular dodecagon fuel rod arrangement 4 and the regular hexagon fuel rod arrangement 6 is determined as described herein. Therefore, as can be seen from FIG. 2(a), the fuel rod 2 at each apex of the regular hexagon fuel rod arrangement 6 forms a regular triangle with the two closest fuel rods 2 at the apexes of the regular dodecagon fuel rod arrangement 4. According to the relation thereof, the fuel rods 2 can be arranged at a very high density.

Further, as can be seen from FIG. 2(a), two adjacent fuel rods 2 at the apexes of the regular hexagon fuel rod arrangement 6 and the fuel rod 2 at the center of the regular hexagon form a regular triangle. According to the relation thereof, the fuel rods 2 can be arranged at a very high density.

Further, as can be seen from FIG. 2(a), all of the fuel rods 2 of the fuel rod arrangement unit 9A are arranged symmetrically against the diagonal line L. Further, in the case that the diagonal line is a straight line L' obtained by rotating the diagonal line L by 30 degrees clockwise or counterclockwise, the fuel rods 2 of the fuel rod arrangement unit 9A are arranged symmetrically against the diagonal line. In this manner, by utilizing the fuel rod arrangement unit as illustrated in FIG. 2(a), a substantially diagonal symmetry can be obtained. In some cases, the diagonal symmetry is absolute.

Further, in the case that the diagonal line is a straight line L" obtained by rotating the diagonal line L by 15 degrees clockwise or counterclockwise, the fuel rods 2 of the regular hexagon fuel rod arrangement 6 are not symmetric against the straight line L". However, by arranging the fuel rod arrangement unit 9A so that deviation of the fuel rods of the regular hexagon fuel rod arrangement 6 are bilaterally symmetric against the diagonal line of the channel box, the fuel rods 2 are symmetric against the diagonal line.

In this manner, the fuel rod arrangement unit 9A, which includes the regular dodecagon fuel rod arrangement 4 and the regular hexagon fuel rod arrangement 6 of the present disclosure, has a large number of fuel rods provided at the apexes of the regular triangles as a whole. Accordingly, the fuel rods 2 can be arranged within the channel box 3 at an extremely high density. Further, according to the fuel rod arrangement unit 9A, the substantial or absolute diagonal symmetry can be obtained, as well.

Next, square grid arrangement and regular triangle grid arrangement in the related art are described for comparison.

FIG. 2(b) illustrates a fuel rod arrangement that is square grid-shaped. As can be seen from FIG. 2(b), in the case of a square grid arrangement, all of the fuel rods are arranged symmetric against the diagonal line L and the diagonal symmetry is satisfied. However, in this case, the distance between the fuel rods located on a diagonal line of the square grid is longer than the distance between the fuel rods located on adjacent apexes of the regular tetragon. Accordingly, it is inferior to the fuel rod arrangement of the present disclosure in view of arrangement density.

FIG. 2(c) illustrates a fuel rod arrangement that is regular triangle grid-shaped. As can be seen from FIG. 2(c), in the case of the regular triangle grid arrangement, all of the fuel rods are provided at the apexes of the regular triangles. Accordingly, the arrangement density of the fuel rods is very high. However, the fuel rods are not arranged symmetric against the diagonal line L, so that the diagonal symmetry is not satisfied.

As is evident from the description herein, the fuel rod arrangement unit 9A as illustrated in FIG. 2(a) is capable of arranging the fuel rods at higher density than the square grid arrangement and has the substantial or even absolute diagonal symmetry which is not obtained by the regular triangle grid arrangement.

Next, a fuel rod arrangement unit 9B arranged at the circumferential area of the fuel assembly 1 while having the regular tetragon fuel rod arrangement 7 at the inside thereof will be described.

Figure 3:
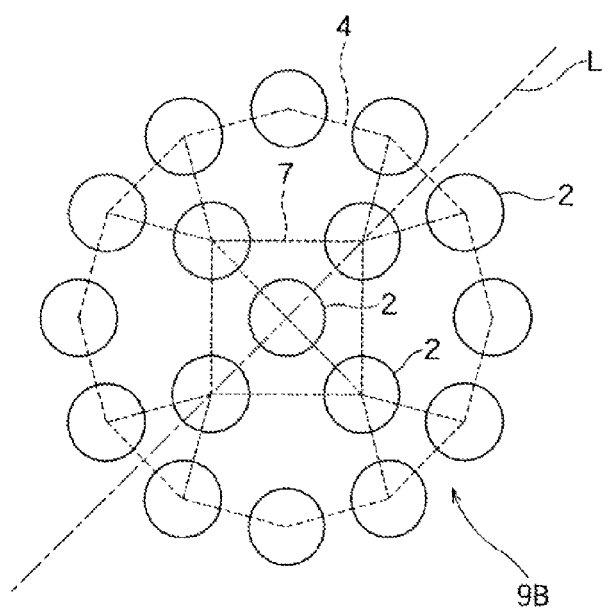
FIG. 3 is a plane sectional view of a fuel rod arrangement unit embodiment having a regular dodecagon fuel rod arrangement and a regular tetragon fuel rod arrangement arranged at the inside thereof.

FIG. 3 is a plane sectional view illustrating the fuel rod arrangement unit 9B. The fuel rod arrangement unit 9B includes the regular dodecagon fuel rod arrangement 4 and the regular tetragon fuel rod arrangement 7 in which a single fuel rod 2 is provided at each apex of the regular tetragon within the regular dodecagon. Further, one fuel rod is provided at the center of the regular tetragon of the regular tetragon fuel rod arrangement, that is, at a position of an intersection point of diagonal lines connecting opposing apexes of the regular tetragon. As illustrated in FIG. 3, each apex of the regular tetragon of the regular tetragon fuel rod arrangement unit 7 is located at a vertex of a regular triangle; each regular triangle having one of every three sides of the regular dodecagon of the regular dodecagon fuel rod arrangement 4 as the base.

As can be seen from FIG. 3, in the case of the fuel rod arrangement unit 9B being similar to the fuel rod arrangement unit 9A, the fuel rod 2 at each apex of the regular tetragon fuel rod arrangement 7 forms a regular triangle with the closest fuel rods 2 at the apexes of the regular dodecagon fuel rod arrangement 4. According to the relation thereof, the fuel rods 2 can be arranged at a very high density. Further, all of the fuel rods 2 of the fuel rod arrangement unit 9B are arranged symmetrically against the diagonal line L, so that the diagonal symmetry is satisfied. In addition, not being illustrated, even against lines obtained by respectively rotating the diagonal line L by 15 degrees, 30 degrees and 45 degrees clockwise or counterclockwise, the diagonal symmetry can be satisfied.

As described herein, in the fuel rod arrangement of the present embodiment as illustrated in FIG. 1, two fuel rod arrangement units adjacent in the first direction and parallel to the diagonal line L are arranged as being connected so as to share one side of the regular dodecagon of the regular dodecagon fuel rod arrangement 4. Meanwhile, two fuel rod arrangement units adjacent in the second direction and perpendicular to the diagonal line L are arranged in regular intervals so that the two sides of the regular dodecagons are parallel and apart by the length of one side of the regular dodecagon.

In this manner, according to the present embodiment, a large number of the fuel rods 2 can be loaded by providing the fuel rods 2 on the apexes of the regular triangles as described herein. Further, as described in detail herein, the diagonal symmetry of the fuel assembly can be substantially or even absolutely satisfied.

Figure 4:
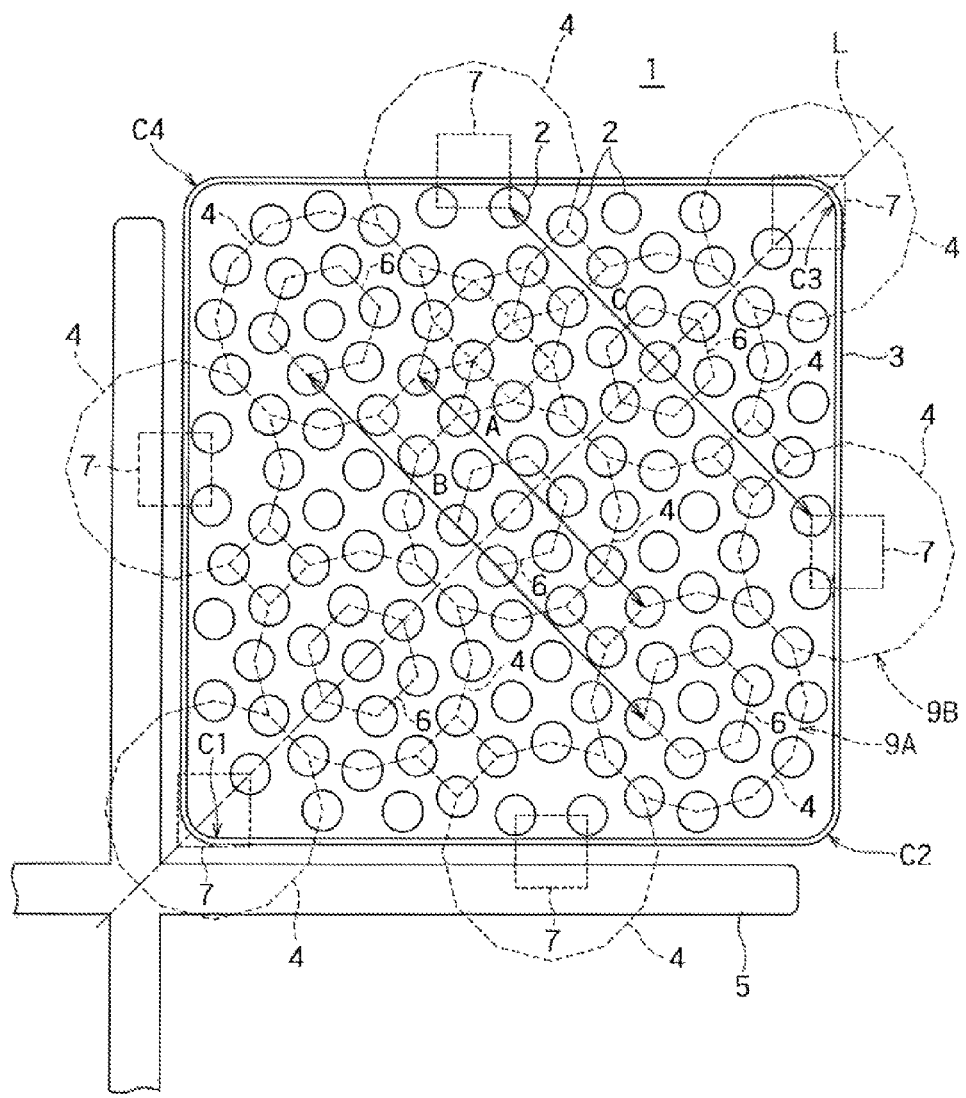
FIG. 4 is an explanatory view for diagonal symmetry of fuel in the fuel assembly embodiment.

Next, the diagonal symmetry of fuel will be described on the fuel assembly 1 according to the present embodiment with reference to FIG. 4. FIG. 4 illustrates the diagonal line L passing through the center of the control rod 5 and passing through the corners C1, C3 of the channel box 3.

As illustrated with an auxiliary line A, the respective fuel rods 2 of the regular dodecagon fuel rod arrangement 4 of the fuel assembly 1 are arranged symmetrically against the diagonal line L. As illustrated with an auxiliary line B, the respective fuel rods 2 of the regular hexagon fuel rod arrangement 6 of the fuel assembly 1 are arranged symmetrically against the diagonal line L, as well. As illustrated with an auxiliary line C, the respective fuel rods 2 of the regular tetragon fuel rod arrangement 7 of the fuel assembly 1 are arranged symmetrically against the diagonal line L, as well. Here, each of the auxiliary lines A, B, C respectively illustrate the symmetry for the fuel rods 2 of a pair of regular dodecagon fuel rod arrangements 4, a pair of regular hexagon fuel rod arrangements 6, and a pair of regular tetragon fuel rod arrangements 7. According to the present embodiment, all of the fuel rods 2 are arranged symmetrically against the diagonal line L.

In this manner, according to the fuel assembly 1 of the present embodiment, the substantial or absolute diagonal symmetry of fuel can be actualized against the diagonal line L, that is, the line passing through the center of the control rod 5 and the center of the fuel assembly 1.

Accordingly, with the fuel assembly 1 according to the present embodiment, combustion of fuel proceeds symmetrically against the diagonal line L, so that improvement of prediction accuracy, operational management efficiency, fuel soundness and fuel economy can be obtained.

Next, modified examples of the fuel assembly according to the present embodiment will be described.

Figure 5:
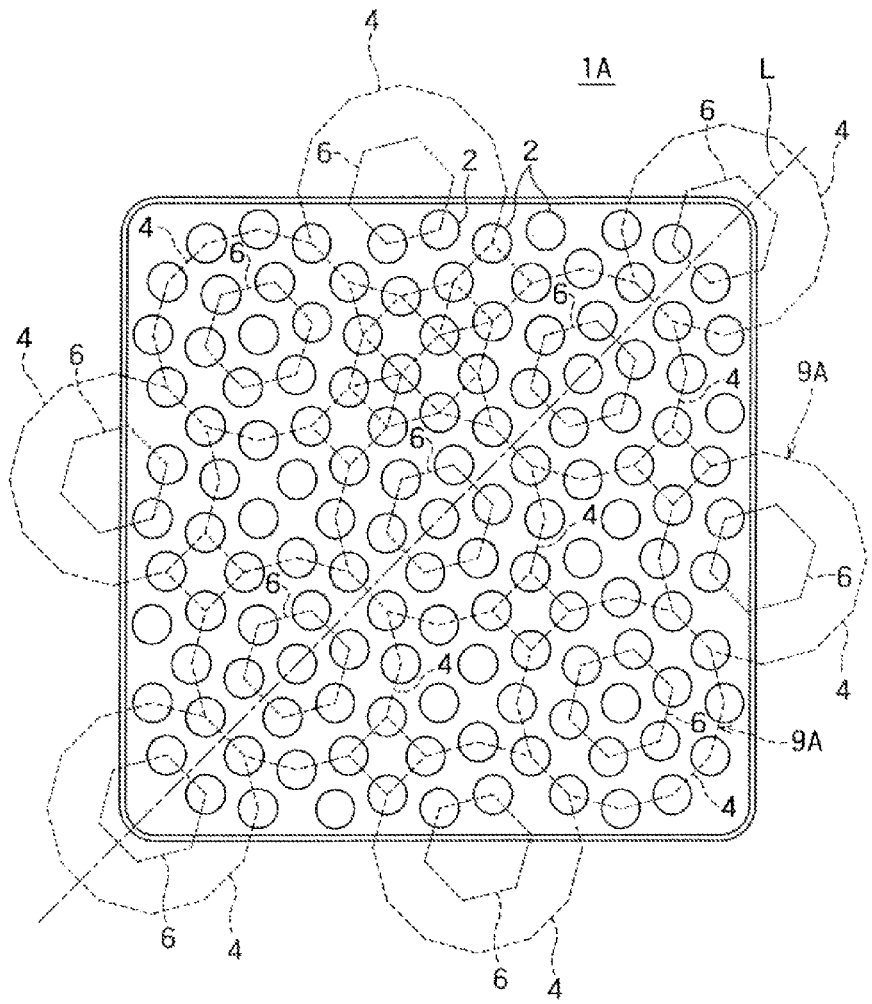
FIG. 5 is a plane sectional view of a fuel assembly having a fuel rod arrangement according to a first modified example of the first embodiment.

FIG. 5 illustrates a plane sectional view of a fuel assembly 1A according to the first modified example. As illustrated in FIG. 5, in the fuel assembly 1A, the regular hexagon fuel rod arrangement 6 is arranged instead of the regular tetragon fuel rod arrangement 7 at the inside of the dodecagon fuel rod arrangement 4 having only a part thereof included in the channel box 3, as well. With comparison to the fuel assembly 1 illustrated in FIG. 4, the fuel assembly 1A illustrated in FIG. 5 has the fuel rod arrangement unit 9A as the structural unit and does not include the fuel rod arrangement unit 9B.

As illustrated in FIG. 5, the diagonal symmetry of fuel is maintained in the fuel assembly 1A, as well. The fuel assembly 1A includes 131 pieces of the fuel rods 2. This is ten pieces more than the number of the fuel rods 2 included in the 11×11 fuel assembly (i.e., 121 pieces).

Here, more generally, the regular hexagon fuel rod arrangement 6 is arranged or the regular tetragon fuel rod arrangement 7 is arranged at the inside of the dodecagon fuel rod arrangement 4 irrespective of whether or not the dodecagon fuel rod arrangement 4 is completely included in the channel box 3.

Further, as illustrated in FIG. 5, in the fuel assembly 1A, all of the regular hexagon fuel rod arrangements 6 within the regular dodecagon fuel rod arrangements 4 are arranged in the same direction. More generally, the direction of the regular hexagon fuel rod arrangement 6 can be determined for each fuel rod arrangement unit 9A. Even with this configuration, the diagonal symmetry of fuel is not impaired.

Next, a second modified example according to the present embodiment will be described with reference to FIG. 6.

Figure 6:
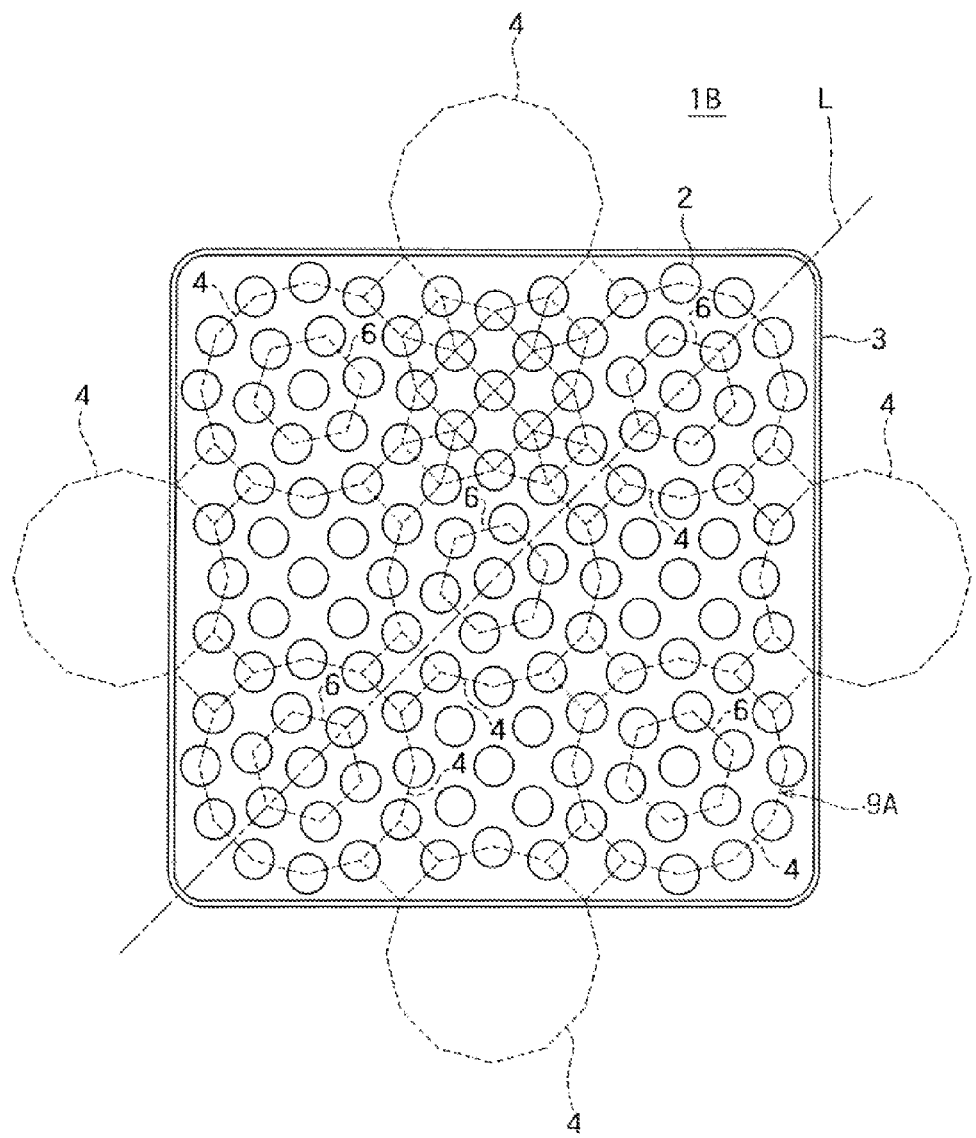
FIG. 6 is a plane sectional view of a fuel assembly having a fuel rod arrangement according to a second modified example (m=n=1) of the first embodiment.

FIG. 6 illustrates a plane sectional view of a fuel assembly 1B according to the second modified example. As illustrated in FIG. 6, in the fuel assembly 1B, the adjacent two regular dodecagon fuel rod arrangements 4 are arranged apart by the length of one side of the regular dodecagon not only in the direction perpendicular to the diagonal line L (i.e. the longitudinal direction) but also in the direction parallel to the diagonal line L (i.e., the transverse direction).

That is, in the fuel assembly 1B of the second modified example, the adjacent two regular dodecagon fuel rod arrangements 4 are arranged so that the opposing two sides of the regular dodecagons are parallel to each other and apart by the first distance A not only in the transverse direction but also in the longitudinal direction (i.e., m=n=1).

As illustrated in FIG. 6, the diagonal symmetry of fuel is maintained in the fuel assembly 1B, as well. The fuel assembly 1B includes 127 pieces of the fuel rods 2. This is six pieces more than the number of the fuel rods 2 included in the 11×11 fuel assembly (i.e., 121 pieces).

Further, in the case that the regular dodecagon fuel rod arrangements 4 adjacent in both the transverse direction and the longitudinal direction do not share any side of the regular dodecagons as in the second modified example, the fuel rod arrangement units 9A, 9B are arranged in a substantially independent manner. Accordingly, spacer parts can be modularized for each fuel rod arrangement unit 9A, 9B. Consequently, productivity of the spacers can be improved.

Figure 7:
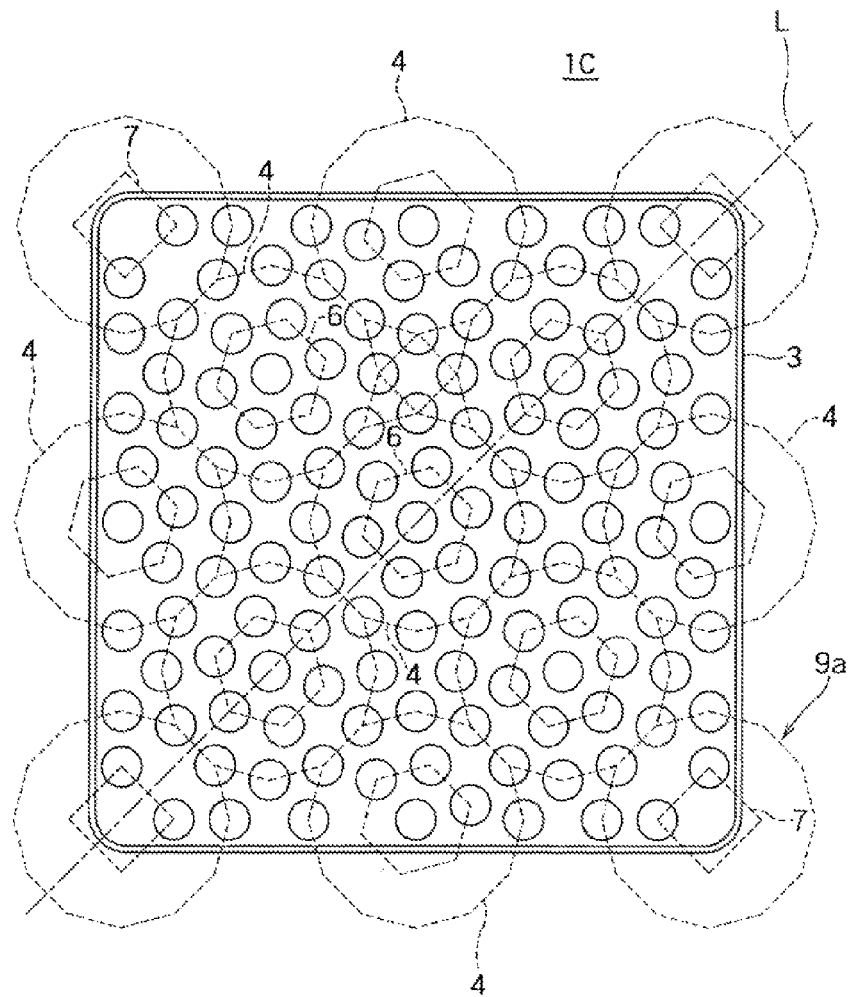
FIG. 7 is a plane sectional view of a fuel assembly having a fuel rod arrangement according to a third modified example (m=n=0) of the first embodiment.

FIG. 7 is a plane sectional view of a fuel assembly 1C according to a third modified example. In the fuel assembly 1C, adjacent regular dodecagon fuel rod arrangements share one side of the regular dodecagon at the part adjacent to each other respectively in both the transverse direction and the longitudinal direction. That is, FIG. 7 is a plane sectional view of the fuel assembly 1 in the case that both the first distance mA and the second distance nA are zero (i.e., m=n=0).

As illustrated in FIG. 7, the diagonal symmetry of fuel is maintained in the fuel assembly 1C, as well. Further, at a mesh portion of mesh structure of the regular dodecagon fuel rod arrangements 4, the fuel rods 2 of the adjacent regular dodecagon fuel rod arrangements 4 constitute a regular triangle therewith. Accordingly, the fuel rods can be arranged at a higher density. Specifically, the fuel assembly 1C includes 131 pieces of the fuel rods 2. This is ten pieces more than the number of the fuel rods 2 included in the 11×11 fuel assembly (i.e., 121 pieces).

Figure 8:
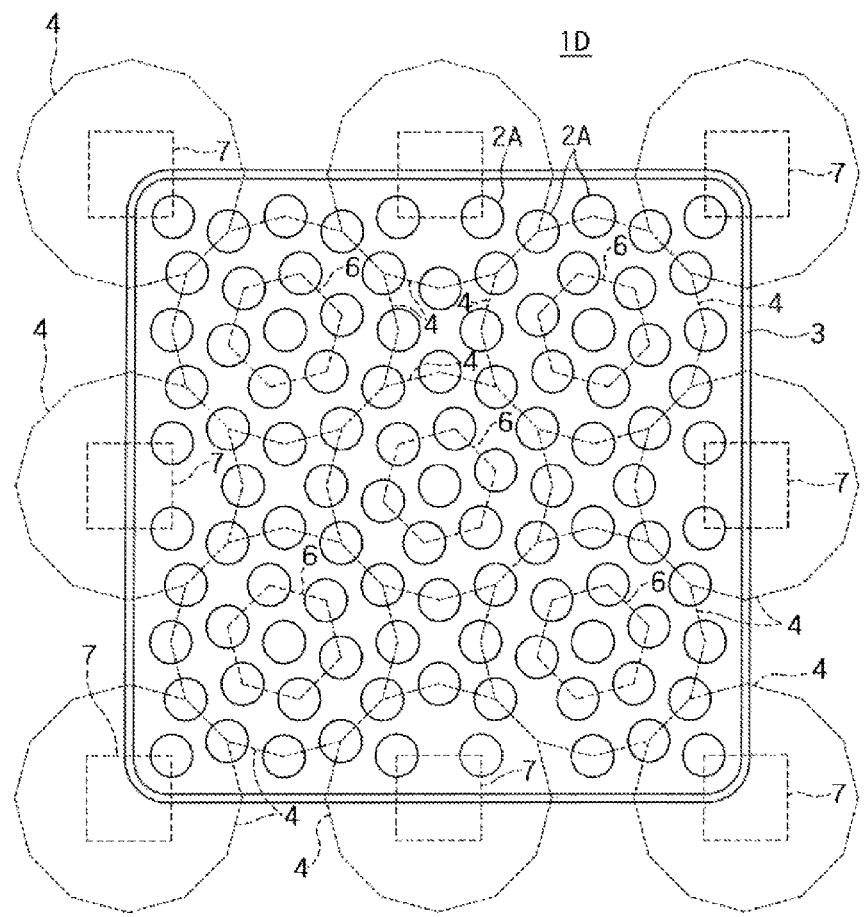
FIG. 8 is a plane sectional view of a fuel assembly having a fuel rod arrangement according to a fourth modified example (m=n=0) of the first embodiment.

Next, it will be described that the present disclosure is applicable to a case having a different number of fuel rods arranged. FIG. 8 is a plane sectional view of a fuel assembly 1D according to a fourth modified example. Being similar to the fuel assembly 1C of FIG. 7, in the fuel assembly 1D, adjacent regular dodecagon fuel rod arrangements share one side of the regular dodecagon at the part adjacent to each other respectively in both the transverse direction and the longitudinal direction (i.e., m=n=0). Here, fuel rods 2A are the same as fuel rods arranged being square grid-shaped to be ten rows by ten columns. The outer diameter of the fuel rod 2A is larger than that of the fuel rod 2.

As illustrated in FIG. 8, the fuel assembly 1D includes 103 pieces of the fuel rods 2A. This is three pieces more than 100 pieces, which is the number of the fuel rods included in a fuel assembly having the fuel rods 2A arranged within the channel box 3 as being square grid-shaped to be ten rows by ten columns.

As is understood from the respective modified examples illustrated in FIGS. 6-8, according to the present disclosure, fuel rods can be arranged at higher density compared to the square grid arrangement and the fuel assembly having the substantial or even absolute diagonal symmetry can be obtained regardless of the distance between the regular dodecagon fuel rod arrangements 4 and the number of the fuel rod arrangements of the fuel assembly.

Next, modified examples of positional relationships between the channel box 3 and the mesh structure constituted by arranging a plurality of the fuel rod arrangement units 9A, 9B in regular intervals in the transverse direction and the longitudinal direction will be described with reference to FIGS. 9-12. Any of FIGS. 9-12 illustrates only the regular dodecagons of the regular dodecagon fuel rod arrangements 4 of the fuel rod arrangement units 9A, 9B. In order to simplify the drawings, the fuel rods 2, similar to FIG. 1, at the respective apexes of the regular dodecagons within the channel box 3 are not shown. In further simplification of the drawings, the regular hexagon fuel rod arrangement 6 or the regular tetragon fuel rod arrangement 7 arranged at the inside of the respective regular dodecagons fuel rod arrangements 4 are not shown.

Figure 9:
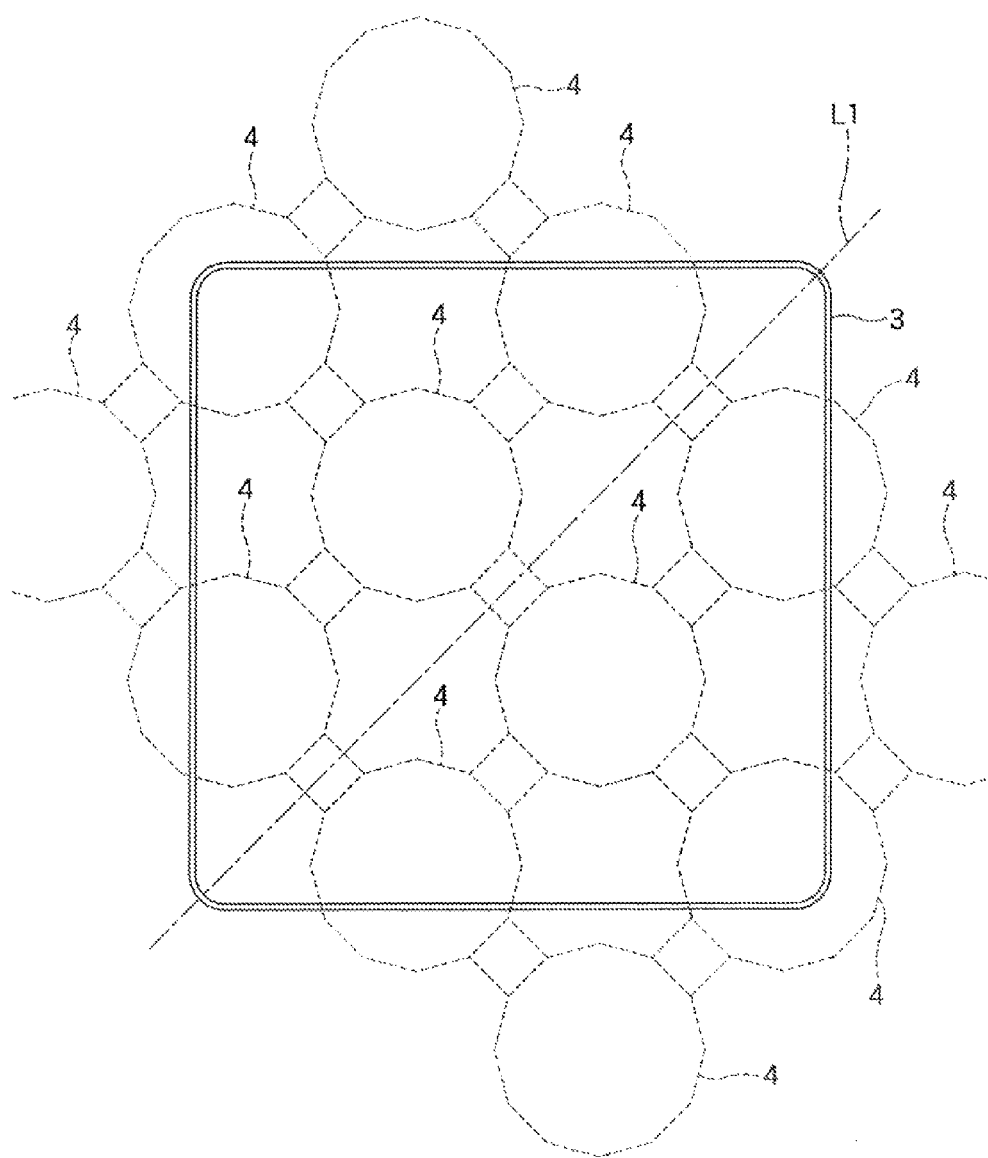
FIG. 9 is a plane sectional view of a fuel assembly in which rows of regular dodecagon fuel rod arrangements aligned along the transverse direction are arranged to be symmetric as sandwiching a diagonal line L of a channel box.
Figure 10:
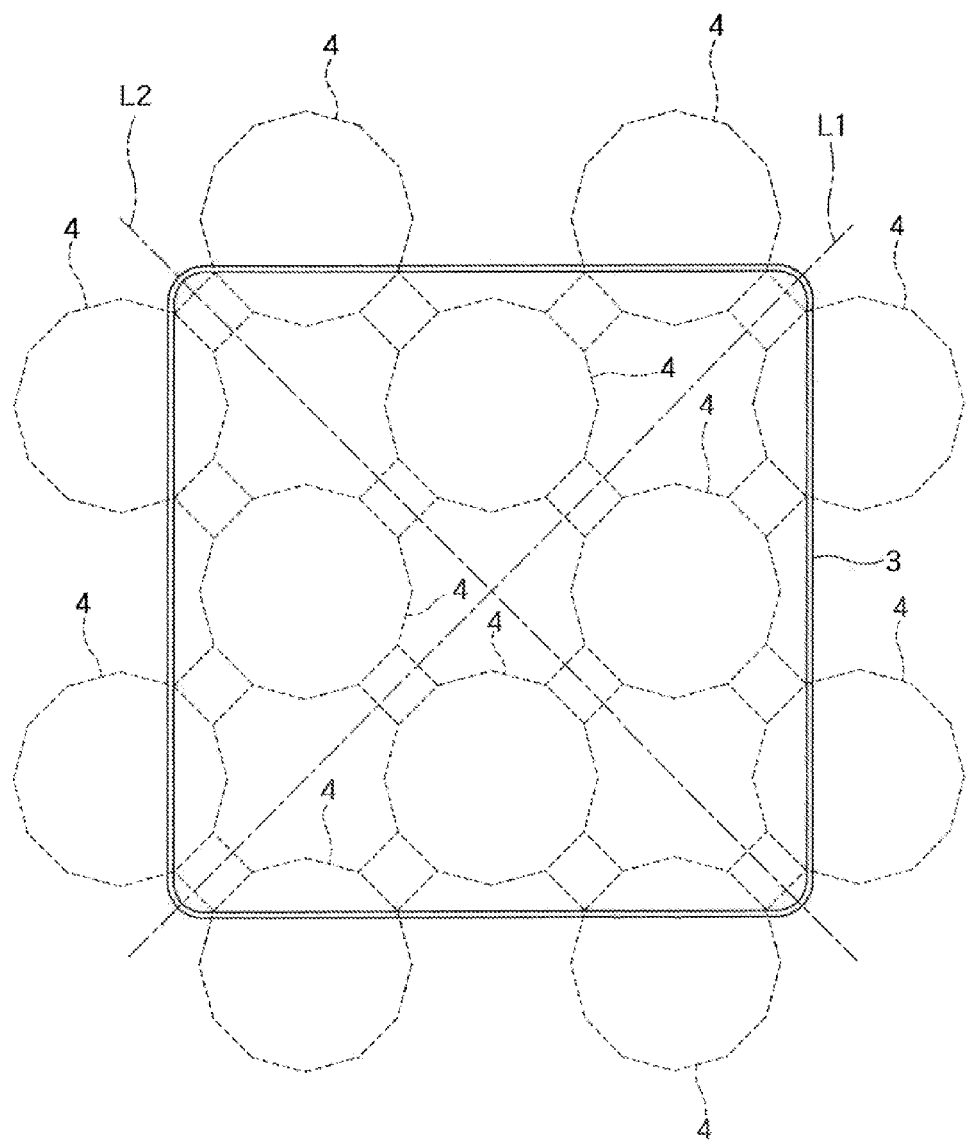
FIG. 10 is a plane sectional view of a fuel assembly in which rows of regular dodecagon fuel rod arrangements aligned along the transverse direction and the longitudinal direction are arranged symmetric as respectively sandwiching diagonal lines L1, L2.

Being similar to the fuel assembly 1 illustrated in FIG. 1, in the modified examples illustrated in FIGS. 9-10, rows constituted with a plurality of the dodecagon fuel rod arrangements 4 are inclined by 45 degrees from one side of the channel box 3. In this way, the relative position between the channel box 3 and the rows is different from the case of the fuel assembly 1 illustrated in FIG. 1.

That is, in FIG. 1, one of the rows of the regular dodecagon fuel rod arrangements 4 aligned in the transverse direction is arranged so that the center of the regular dodecagon fuel rod arrangement 4 is located on the diagonal line L. Meanwhile, in FIG. 9, the rows of the regular dodecagon fuel rod arrangements 4 aligned in the transverse direction are arranged to be symmetric as sandwiching the diagonal line L1. Here, the diagonal line L1 corresponds to the diagonal line L in FIG. 1, that is the line connecting the corner of the channel box 3 closest to the control rod (not illustrated, but being similar to FIG. 1) and the diagonal corner thereof. Thus, the case that the rows of the regular dodecagon fuel rod arrangements 4 are arranged to be symmetric as sandwiching the diagonal line is included in the symmetric arrangement against a diagonal line of FIG. 9.

FIG. 10 illustrates a fuel assembly in which rows of the regular dodecagon fuel rod arrangements 4 aligned in the longitudinal direction are arranged to be symmetric as sandwiching the diagonal line L2 that is perpendicular to the diagonal line L1 at the center of the channel box 3. In addition, the rows of the regular dodecagon fuel rod arrangements 4 aligned in the transverse direction are arranged to be symmetric as sandwiching the diagonal line L1.

Figure 11:
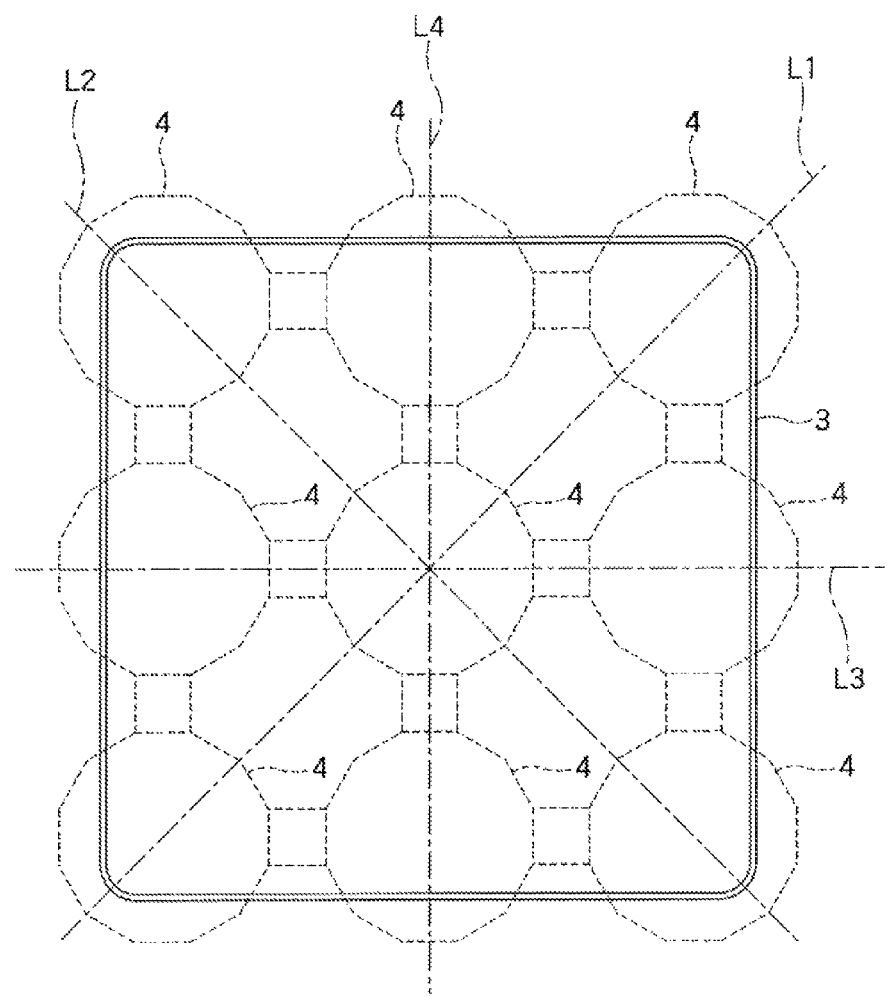
FIG. 11 is a plane sectional view of a fuel assembly in which rows of regular dodecagon fuel rod arrangements aligned along the transverse direction or the longitudinal direction are arranged parallel to one side of the channel box.
Figure 12:
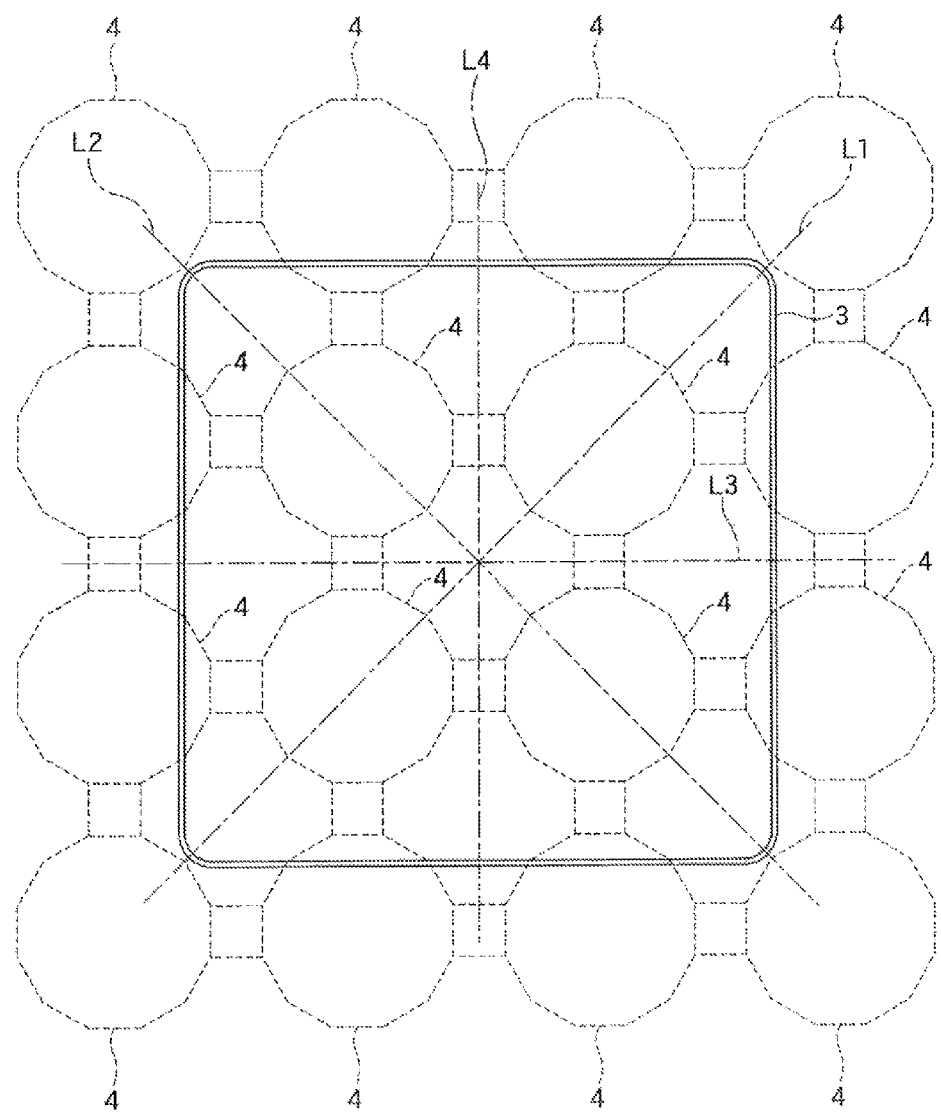
FIG. 12 is a plane sectional view of a fuel assembly in which rows of regular dodecagon fuel rod arrangements aligned along the transverse direction or the longitudinal direction are arranged parallel to one side of the channel box.

Next, another modified example of the present embodiment relating to positional relation between the channel box and the mesh structure will be described with reference to FIGS. 11-12. In FIGS. 11-12, rows constituted with a plurality of the regular dodecagon fuel rod arrangements 4 are arranged parallel to a side of the channel box 3. That is, in the present disclosure, the transverse direction (or the longitudinal direction) used as a reference to determine the direction of aligning the regular dodecagon fuel rod arrangements 4 may be set parallel to a side of the channel box 3.

Further, as illustrated in FIGS. 11-12, the regular dodecagon fuel rod arrangements 4 are arranged to be symmetric against the diagonal line L1 and the diagonal line L2. In addition, as illustrated in FIGS. 11-12, it is preferable that the regular dodecagon fuel rod arrangements 4 are arranged to be symmetric also against lines L3, L4 which respectively connect midpoints of opposing sides of the channel box 3.

There are different methods to arrange the regular dodecagon fuel rod arrangements 4 to be symmetric against the lines L3, L4. There are cases that the rows of the regular dodecagon fuel rod arrangements 4 are arranged on the lines L3, L4 as illustrated in FIG. 11 and other cases that the rows of the regular dodecagon fuel rod arrangements 4 are arranged to be symmetric to each other as sandwiching the lines L3, L4 as illustrated in FIG. 12.

In this manner, by arranging the fuel rods so as to obtain symmetry against the lines L3, L4 in addition to the diagonal symmetry of fuel, a further even burnup can be actualized within the fuel assembly, so that soundness and economy of fuel can be further improved.

As described herein, the fuel assemblies of the first embodiment and the modified examples thereof are described with reference to FIGS. 1-12. The description is performed in the combination of m and n as being (0, 0), (0, 1) and (1, 1). However, the fuel assembly in which the regular dodecagon fuel rod arrangements 4 are arranged can be obtained even with combinations of m and n other than described herein. Here, the length of one side of the regular dodecagon in FIGS. 1-12 is the same as the distance between the centers of the adjacent fuel rods when the fuel rods are arranged in the channel box that is square grid-shaped and eleven rows by eleven columns (ten rows by ten columns in the case of FIG. 8). However, since the length of one side of the regular dodecagon varies corresponding to the design, the possible embodiments are not limited to the dimensions in the drawings. That is, the length of one side of the regular dodecagon (consequently, the size of the regular dodecagon fuel rod arrangement 4) can be preferably varied corresponding to the design for the dimensions of the channel box 3.

As described herein, in the present embodiment, the fuel rod arrangement units 9A, 9B respectively having the regular dodecagon fuel rod arrangement 4 and the regular hexagon fuel rod arrangement 6 or the regular tetragon fuel rod arrangement 7 arranged at the inside thereof are arranged and aligned respectively in regular intervals in the traverse direction and the longitudinal direction. Here, arranging of the fuel rod arrangement units 9A, 9B in regular intervals includes arranging two adjacent fuel rod arrangement units that are connected as sharing one side of the regular dodecagon of the regular dodecagon fuel rod arrangement 4.

Accordingly, with the present embodiment, a larger number of the fuel rods 2 can be loaded within the channel box 3 having the same dimensions as those in the related art. In addition, the respective fuel rods 2 of the fuel assembly can be arranged with substantial symmetry against the line connecting the corner of the channel box that is closest to the control rod and the diagonal corner (i.e., the diagonal line L, L1).

That is, according to the present embodiment and the modified examples thereof, a larger number of the fuel rods can be loaded within the channel box having the same dimensions as those in the related art. Further, the substantial diagonal symmetry of fuel can be actualized. As a result, combustion of fuel proceeds symmetrically, so that soundness and economy of fuel can be improved.

Further, as in the fuel assembly 1 of FIG. 1 for example, at least a part of the fuel rod arrangement units 9A, 9B may be independently arranged such that with respect to the dimensions mA and nA, either m or n is not zero. In particular, as in the fuel assembly 1B illustrated in FIG. 6, the fuel rod arrangement units 9A, 9B are arranged in a substantially independent manner in the case that both m and n are not zero. Accordingly, spacer parts can be modularized for each fuel rod arrangement unit 9A, 9B. Consequently, productivity of the spacers can be improved.

Next, the second embodiment of a fuel assembly including a water rod will be described. In the present embodiment, determined fuel rods, among the fuel rods arranged in the fuel assembly, are replaced with a water rod. Accordingly, planarization of output distribution of the fuel assembly, improvement of reactivity, and improvement of the void reactivity coefficient can be achieved.

Figure 13:
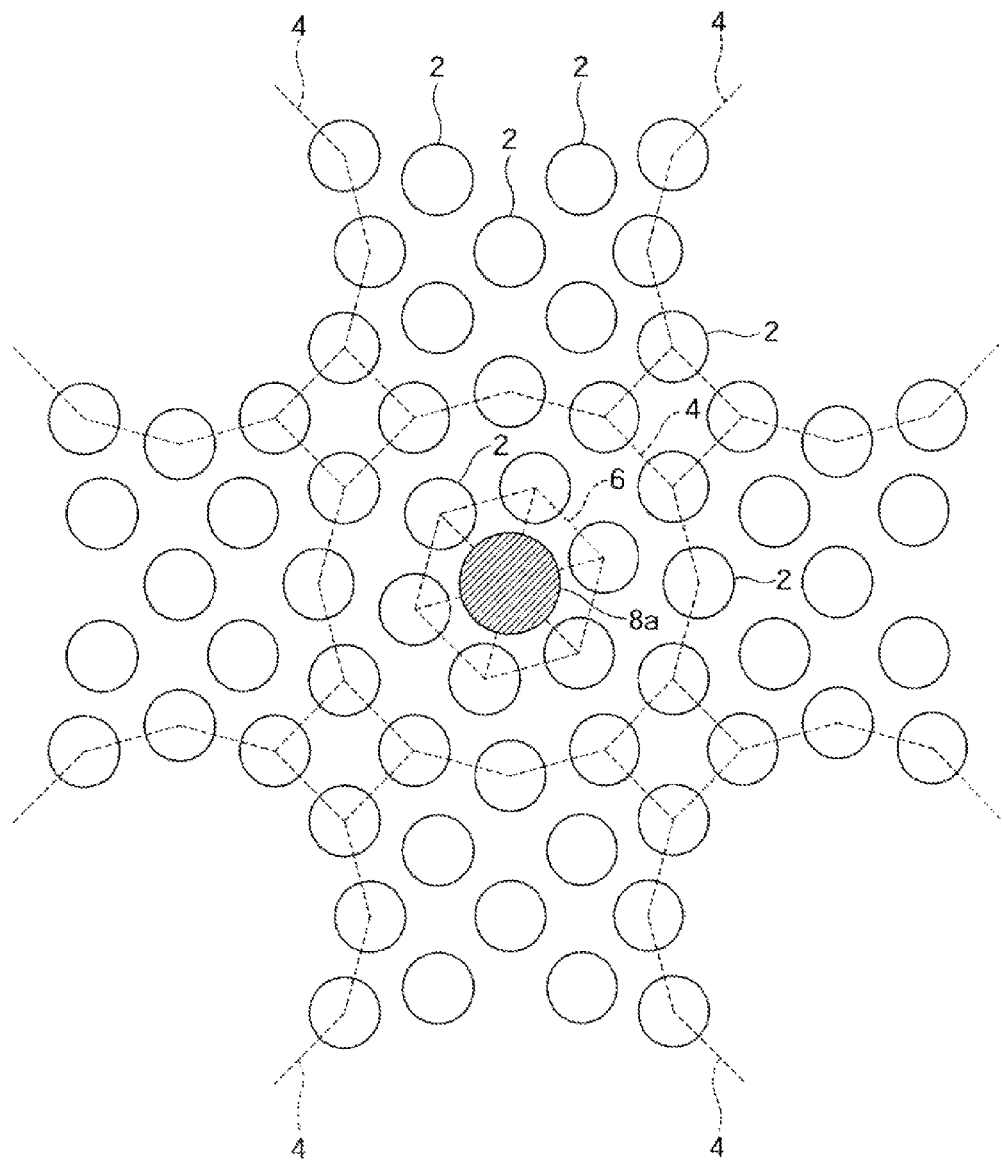
FIG. 13 is a plane sectional view which illustrates a fuel rod arrangement in which a determined regular hexagon fuel rod arrangement has one water rod at a position of an intersection point of diagonal lines of apexes of the regular hexagon.

FIG. 13 illustrates a fuel rod arrangement in which a regular hexagon fuel rod arrangement 6 of a determined fuel rod arrangement unit 9A among a plurality of fuel rod arrangement units arranged in the fuel assembly has one water rod 8a at a position of an intersection point of diagonal lines connecting the opposing apexes of the regular hexagon (i.e., the center of the regular hexagon).

As is evident from FIG. 13, the water rod 8a is located at a position having the same distance from the surrounding fuel rods 2. Accordingly, the fuel rods 2 around the water rod 8a can obtain effects of neutron moderation and heat elimination evenly by the water rod 8a.

Figure 14:
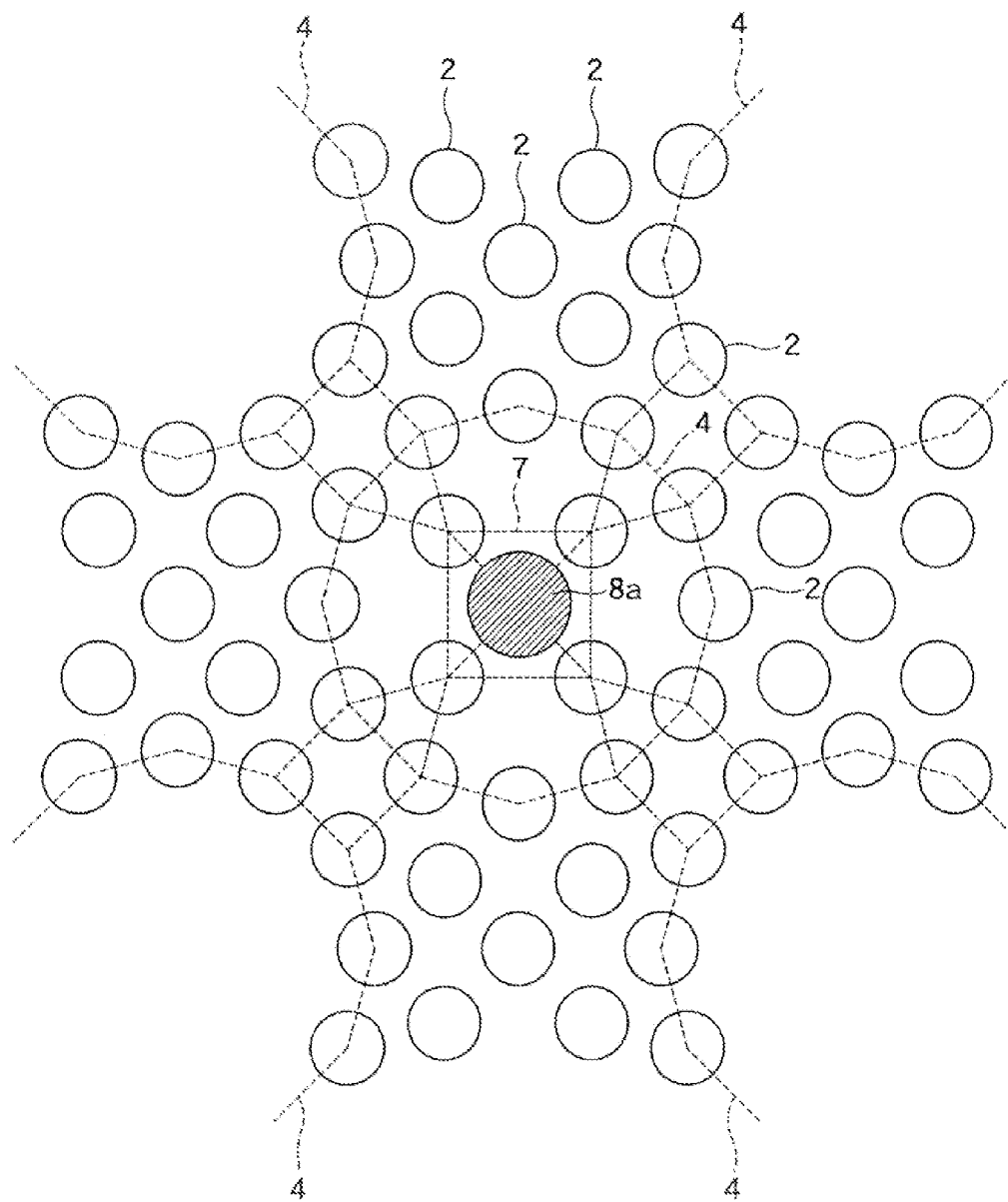
FIG. 14 is a plane sectional view which illustrates a fuel rod arrangement in which a determined regular tetragon fuel rod arrangement has one water rod at a position of an intersection point of diagonal lines of apexes of the regular tetragon.

In the second embodiment, as illustrated in FIG. 14, it is also possible to structure the fuel rod arrangement in which a regular tetragon fuel rod arrangement 7 of a determined fuel rod unit 9B has one water rod at a position of intersection point of diagonal lines connecting the opposing apexes of the regular tetragon (i.e., the center of the regular tetragon). In this case as well, the water rod is located at a position having the same distance from the surrounding fuel rods, so that the similar effects can be obtained thereby.

Figure 15:
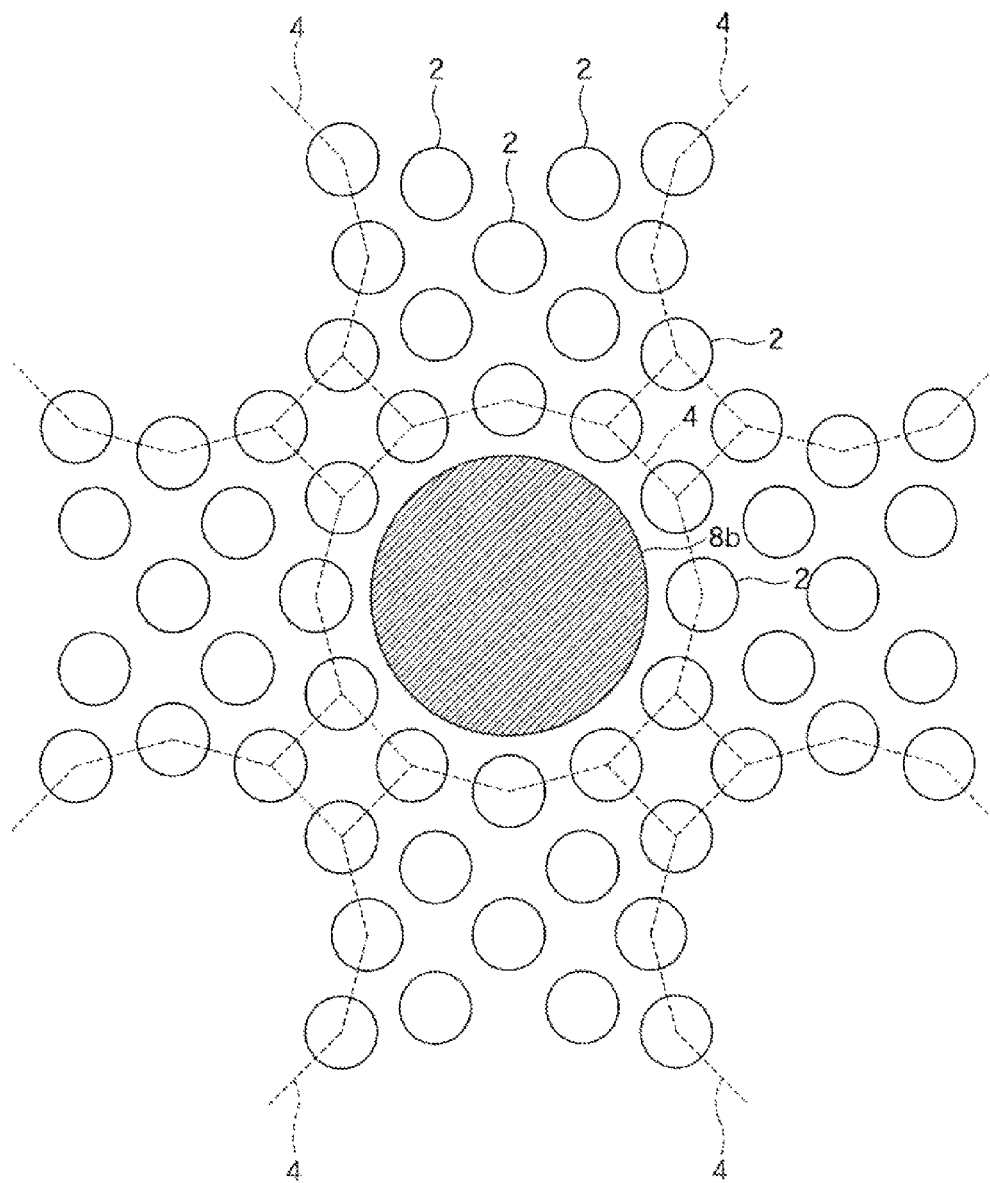
FIG. 15 is a plane sectional view which illustrates a fuel rod arrangement in which a determined regular dodecagon fuel rod arrangement has one water rod at a position of an intersection point of diagonal lines of apexes of the regular dodecagon (i.e., the center of the dodecagon) without having a fuel rod at the inside in addition thereto.

FIG. 15 illustrates a fuel rod arrangement in which a regular dodecagon fuel rod arrangement 4 of a determined fuel rod arrangement unit 9A has one water rod 8b of a large diameter at a position of an intersection point of diagonal lines of apexes of the regular dodecagon (i.e., the center of the dodecagon) without having the fuel rod 2 at the inside of the regular dodecagon. In other words, in the fuel rod arrangement of FIG. 15, the entire regular hexagon fuel rod arrangement 6 in the regular dodecagon fuel rod arrangement 4 is replaced with the water rod 8b.

As is evident from FIG. 15, in the fuel rod arrangement, the water rod 8b is located at the position evenly distanced from the surrounding fuel rods 2, that is, evenly distanced from the respective fuel rods 2 of the regular dodecagon fuel rod arrangement 4. Accordingly, the fuel rods 2 of the regular dodecagon fuel rod arrangement 4 around the water rod 8b can receive effects of neutron moderation and heat elimination evenly by the water rod 8b.

As illustrated in FIG. 15, it is also possible to replace the entire regular tetragon fuel rod arrangement 7 of the fuel rod arrangement unit 9B illustrated in FIG. 3 with a water rod.

Figure 16:
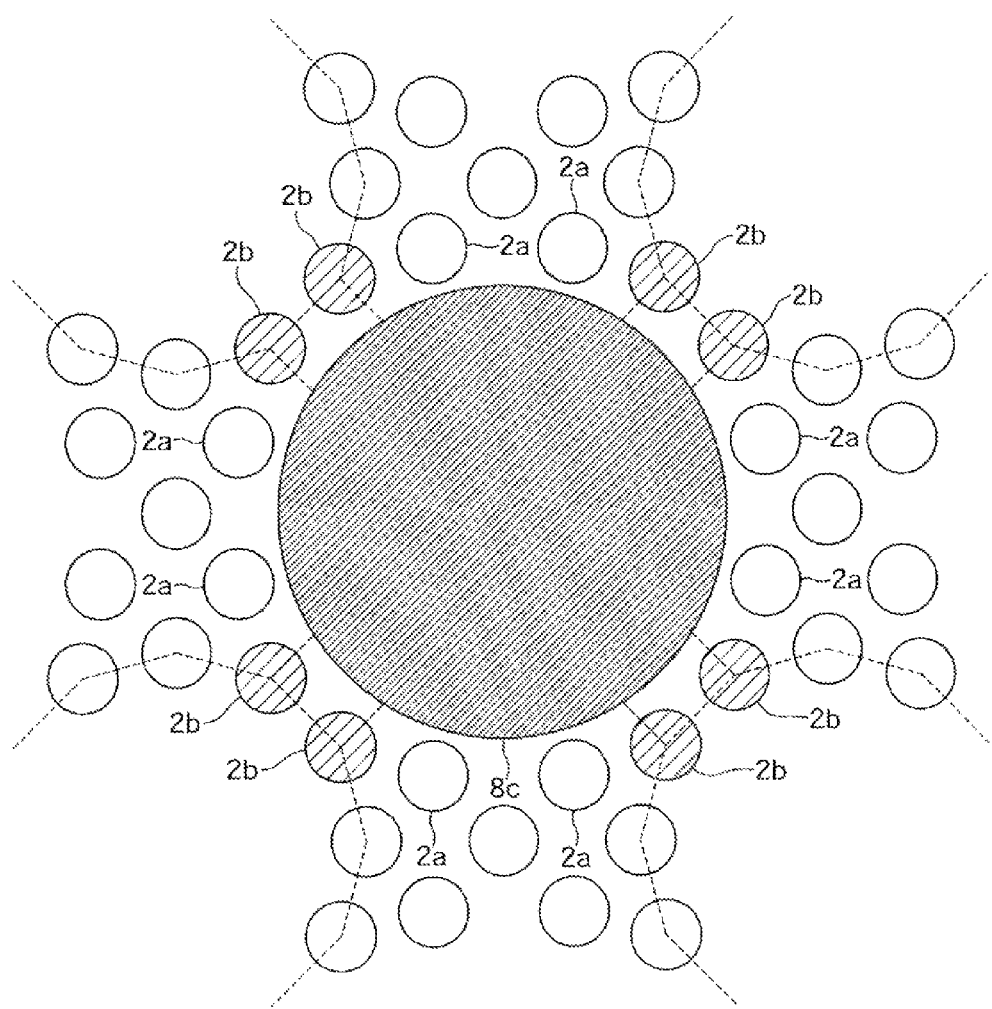
FIG. 16 is a plane sectional view illustrating a fuel rod arrangement in which a determined regular dodecagon fuel rod arrangement is replaced with one water rod as a whole.

FIG. 16 illustrates a fuel rod arrangement in which one entire fuel rod arrangement unit 9A, 9B (i.e., the regular dodecagon fuel rod arrangement 4) is replaced with one water rod 8c of a large diameter. In this case, eight pieces of the fuel rods 2a and eight pieces of the fuel rods 2b among sixteen pieces of the fuel rods 2 arranged around the water rod 8c have the respective same distances from the water rod 8c, so that the effects of neutron moderation and heat elimination due to the water rod 8c can be obtained. For example, the large diameter water rod 8c illustrated in FIG. 16 can be preferably adopted to an upsized fuel assembly for the next generation.

In addition, the water rod can be configured to vary the diameter size at a midway point, or some other point, in the axial direction of the fuel rod 2. Since neutrons are moderated by a moderator (e.g., light water), the diameter of the water rod can be relatively reduced at the lower portion of fuel. Meanwhile, since a larger neutron moderation efficiency than that at the lower portion is desired at the upper portion of fuel due to influence of void, the diameter of the water rod can be enlarged at the upper portion. By varying the diameter of the water rod in the axial direction, both the neutron moderation effect and the loading amount of the fuel rods can be obtained. A specific example of such a water rod having a different diameter at different points in the axial direction will be described with reference to FIG. 17.

Figure 17:
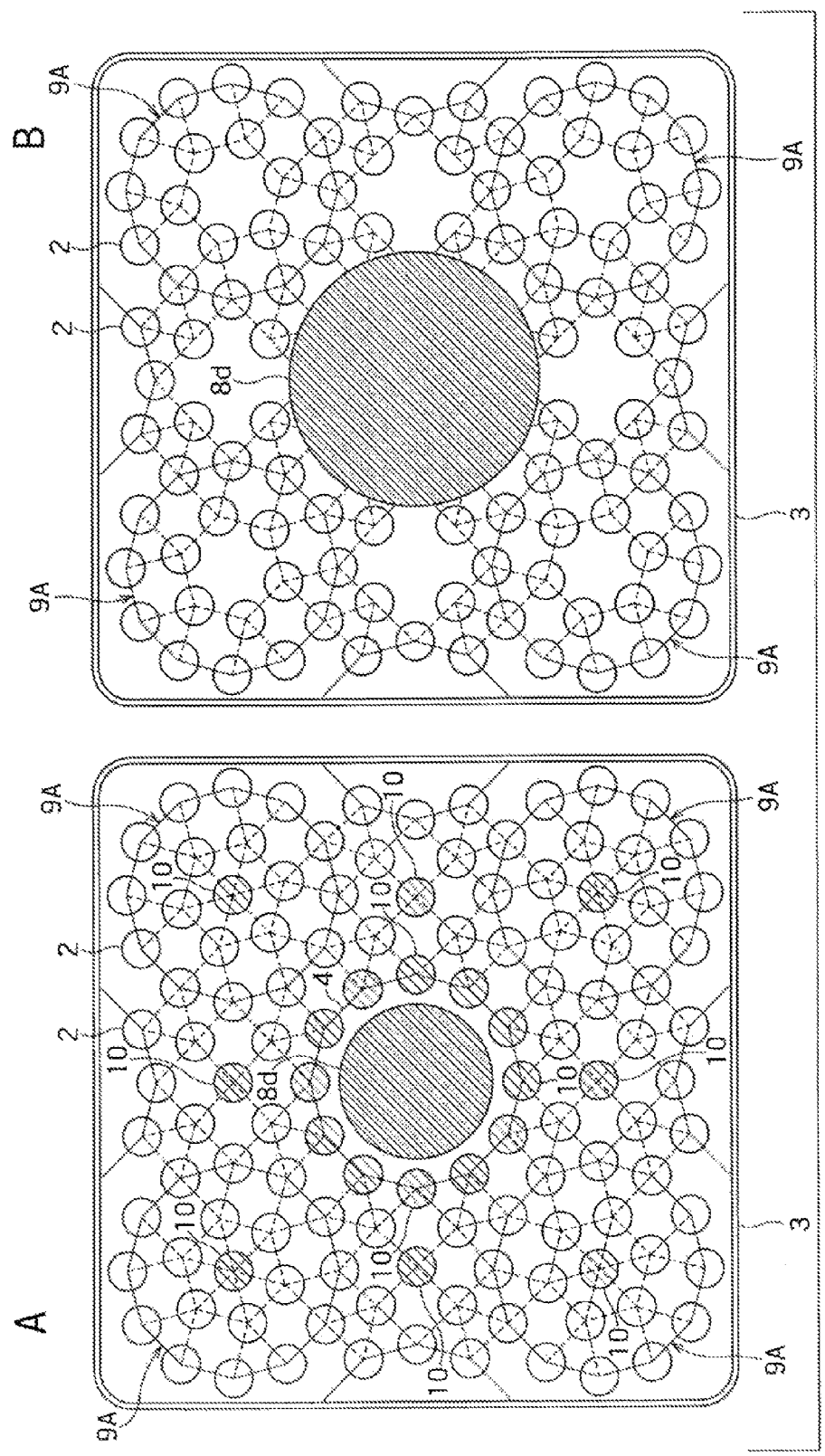
FIG. 17 is a plane sectional view of a fuel assembly according to a second embodiment having short fuel rods. View A is a plane sectional view at a fuel lower portion and view B is a plane sectional view at a fuel upper portion.

FIG. 17 is a plane sectional view viewing from above. In the drawing, view A illustrates a lower portion section of the fuel assembly, and view B illustrates an upper portion section of the same fuel assembly.

Figure 20:
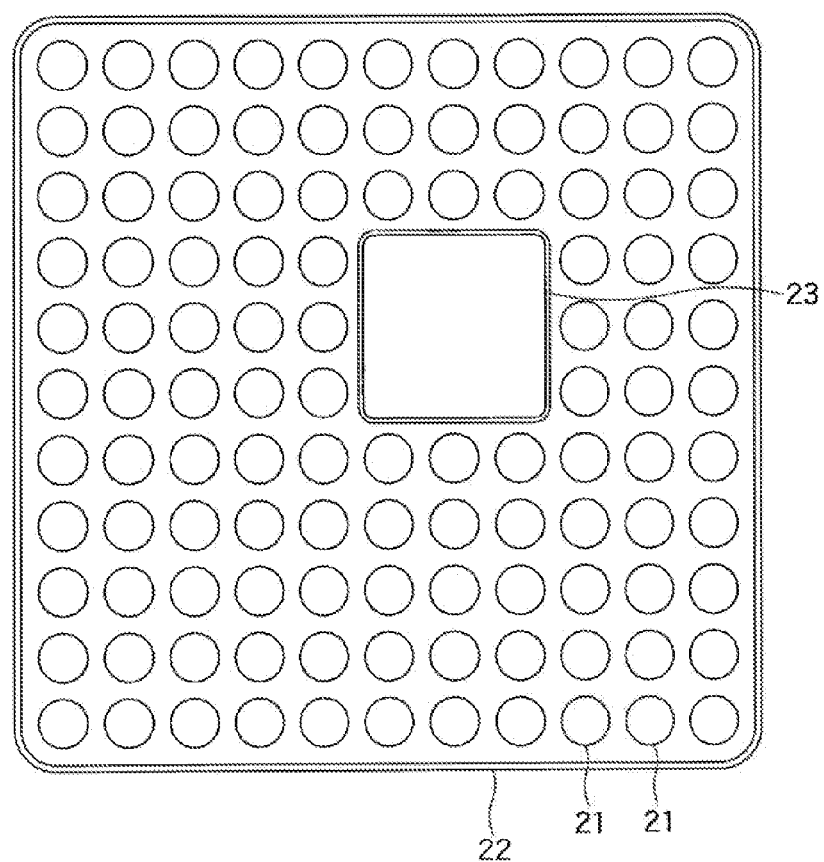
FIG. 20 is a plane sectional view of a fuel assembly having a fuel rod arrangement that is square grid-shaped in the related art.

Here, the length of one side of the regular dodecagon and the diameter of the fuel rod of FIG. 17 are the same as the distance between the centers of the adjacent fuel rods and the fuel rod diameter in the fuel rod arrangement illustrated in FIG. 20. That is, the distance between the centers of the adjacent fuel rods and the fuel rod diameters in the fuel assembly of FIG. 17 are the same as those of FIG. 20 where the fuel rod arrangement has fuel rods aligned to be eleven rows by eleven columns within the channel box.

As illustrated in the lower portion section view A of FIG. 17, the regular dodecagon fuel rod arrangements 4 are arranged similar to those in FIG. 6. Here, the regular dodecagon fuel rod arrangement 4 arranged at the center of the channel box 3 and having a water rod 8d arranged at the inside thereof is configured to have a single short fuel rod 10 provided at each apex of the regular dodecagon.

Further, as illustrated in the lower portion section view A of FIG. 17, four of the fuel rod arrangement units 9A are arranged respectively at four corners of the channel box 3. A single short fuel rod 10 is provided at the center of the regular hexagon fuel rod arrangement 6 at the inside of each fuel rod arrangement unit 9A. Similarly, four short fuel rods 10 are arranged respectively between the regular dodecagon fuel rod arrangements 4.

Meanwhile, as illustrated in the upper portion section view B of FIG. 17, in the fuel rod arrangement of the upper portion section view B, the fuel rod is excluded from the positions at which the short fuel rods 10 are arranged. Further, the water rod 8d is arranged at the center of the fuel assembly. Here, the diameter is larger than that at the fuel lower portion view A. That is, on the midway from the fuel lower portion view A to the fuel upper portion view B, the water rod 8d is enlarged in diameter at the fuel upper portion view B at which twelve pieces of the short fuel rods 10 surrounding the water rod 8d do not exist.

More specifically, at the fuel lower portion view A at which the short fuel rods 10 exist, the water rod 8d is configured to have approximately the same diameter as that of the water rod 8b illustrated in FIG. 15. Then, at the fuel upper portion view B at which the short fuel rod 10 does not exist, the water rod 8d is configured to have the approximately same diameter as that of the water rod 8c illustrated in FIG. 16. That is, at the fuel upper portion view B at which the short fuel rod 10 does not exist, the water rod 8d has the diameter corresponding to the entire regular dodecagon fuel rod arrangement 4.

Now, the area occupied by the water rod 8d will be compared to the area occupied by the water rod 23 of the fuel assembly in the related art illustrated in FIG. 20. The area occupied by the water rod 8d corresponds to the amount of seven (=6+1) pieces of the fuel rods at the lower portion view A section and corresponds to the amount of nineteen (=12+6+1) pieces of the fuel rods at the upper portion view B section illustrated in FIG. 17.

Accordingly, compared to the water rod 23 occupying the area corresponding to nine pieces of the fuel rods, the occupying area of the water rod 8d is slightly smaller at the fuel lower portion view A and larger at the fuel upper portion view B.

By reducing the diameter of the water rod at the fuel lower portion view A in which neutron moderation efficiency is by the moderator is more than desired, fuel can be loaded possibly in a larger number. Meanwhile, by enlarging the diameter of the water rod at the fuel upper portion view B in which larger neutron moderation efficiency is desired, nuclear efficiency can be improved.

Here, fuel loading amounts will be specifically compared. The number of loaded fuel rods in the fuel assembly of FIG. 17 is 120 pieces at the fuel lower portion, and that is larger than that of the fuel assembly in the related art (i.e., 112 pieces) as illustrated in FIG. 20. Meanwhile, since the short fuel rods 10 are arranged, the number of loaded fuel rods at the fuel upper portion is 100 pieces, which may be relatively small. However, in many cases, the short fuel rod 10 has length that is longer than a half of the fuel rod 2 (of standard length). Accordingly, on the basis of the entire fuel assembly, the fuel amount loaded in the fuel assembly of FIG. 17 is more than the fuel amount loaded in the fuel assembly in the related art of FIG. 20.

Here, since the length of one side of the regular dodecagon and the diameter of the fuel rod vary corresponding to the design, the possible embodiments are not limited to the dimensions in FIG. 17.

Further, the water rod is not limited to the one illustrated in FIG. 17, of which diameter varies as described herein. Under conditions that the diameter of the water rod at the fuel upper portion view B at which the short fuel rod 10 does not exist is larger than the diameter of the water rod at the fuel lower portion at which the short fuel rod 10 does exist, the water rods 8a, 8b, 8c illustrated in FIGS. 13-16 can be combined in many ways.

The present embodiment is described based on the arrangement of the regular dodecagon fuel rod arrangements 4 illustrated in FIG. 6 (i.e. in the case of m=n=1). However, not limited to this, the water rod may be provided to a fuel assembly having another arrangement of the regular dodecagon fuel rod arrangements 4.

As described herein, in the second embodiment, some fuel rods constituting at least a part of a determined fuel rod arrangement unit are replaced with a water rod. Accordingly, the distances between the water rod and surrounding fuel rods are substantially equalized so that the fuel rods around the water rod can evenly receive the neutron moderation effect by the water rod. As a result, planarization of output distribution of the fuel assembly, improvement of reactivity, and improvement of the void reactivity coefficient due to the water rod can be achieved.

Next, the third embodiment according to the present disclosure will be described. In the present embodiment, the fuel rod arrangements described in the first and second embodiments are adopted to a larger channel box for the next generation and after.

Figure 18:
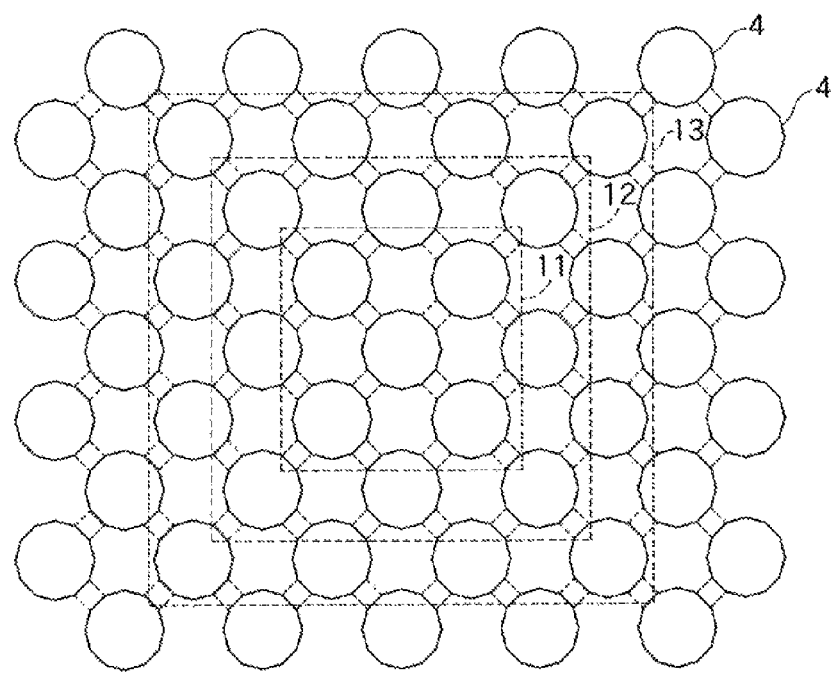
FIG. 18 is a plane sectional view illustrating a fuel rod arrangement embodiment for a channel box of a large size fuel assembly for a next generation reactor.
Figure 19:
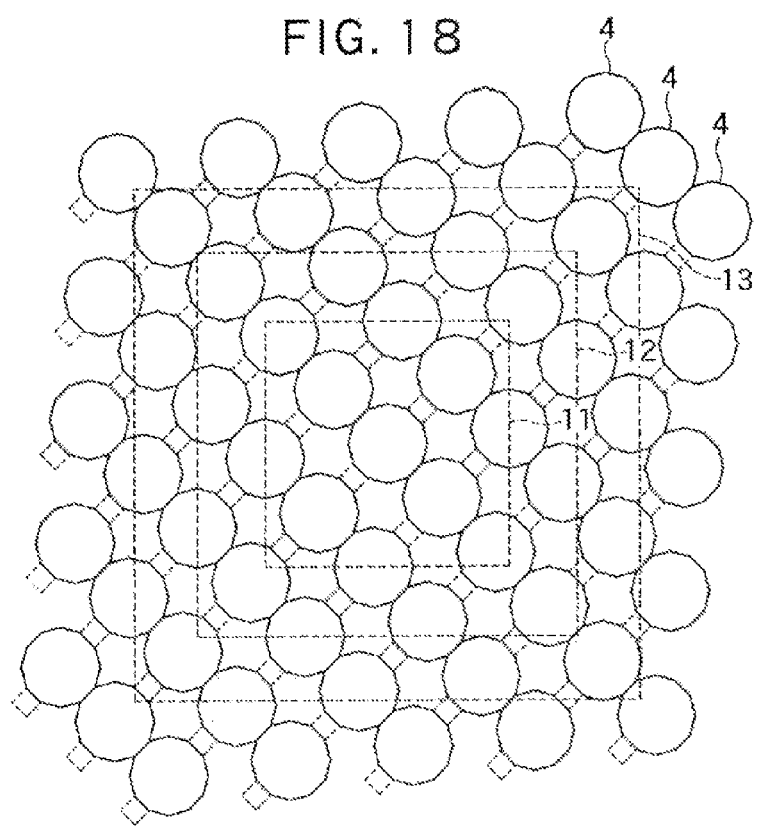
FIG. 19 is a plane sectional view illustrating a fuel rod arrangement embodiment for a channel box of a large size fuel assembly for a next generation reactor.

FIGS. 18-19 are plane sectional views of the present embodiment illustrating fuel rod arrangements for a channel box of a large size fuel assembly for the next generation. FIGS. 18-19 only illustrate regular dodecagon fuel rod arrangements 4 of fuel rod arrangements viewing a fuel assembly from above. Further, in the drawings, auxiliary lines of dotted lines indicate several non-limiting channel box structures. Both of FIGS. 18-19 only illustrate regular dodecagons of the regular dodecagon fuel rod arrangements 4 of the fuel rod arrangement units 9A, 9B. However, being similar to FIG. 1 and the like, the fuel rods 2 are provided at the apexes of the regular dodecagon, and then, the regular hexagon fuel rod arrangement 6 or the regular tetragon fuel rod arrangement 7 is arranged at the inside of the regular dodecagon. That is, it is understood that the particular regular dodecagon fuel rod arrangements 4 of FIGS. 18-19 are consistent with the embodiments described herein, and FIGS. 18-19 are simplified for ease in understanding.

Numeral 11 in FIGS. 18-19 indicates a channel box of a fuel assembly for an existing boiling-water reactor. Numeral 12 indicates a channel box in the case that the size of the fuel assembly becomes one and one half times larger than that of the existing channel box 11. Numeral 13 indicates a channel box in the case that the size of the fuel assembly becomes two times larger than that of the existing channel box 11.

Being similar to FIG. 6, FIG. 18 illustrates arrangement of the regular dodecagon fuel rod arrangements 4 in the case of m=n=1, and then, FIG. 19 illustrates arrangement in the case of m=1 and n=0. However, it is also possible to adopt other arrangements.

As illustrated in FIGS. 18-19, in the channel box 12 or the channel box 13 of a large size fuel assembly for an assumed next generation reactor, it is also possible to maintain relative positional relationships between the channel box 3 and the mesh-shaped structure constituted with the regular dodecagon fuel rod arrangements 4 aligned along the longitudinal direction and the transverse direction. Further, it is also possible to maintain relative relationship between a water rod (not illustrated) and surrounding fuel rods regardless of the size of the channel box. Accordingly, the fuel rods can be arranged similarly to the first and second embodiments even when the channel box is enlarged.

In this manner, according to the present embodiment, it is possible to obtain a large size fuel assembly for the next generation having similar fuel rod arrangement to the first and second embodiments.

Additional advantages and modifications will readily occur to those skilled in the art.

Therefore, the disclosure in its broader aspects is not limited to the specific details and representative embodiments shown and described herein.

Accordingly, various modifications may be made without departing from the spirit or scope of the general inventive concepts as defined by the appended claims and their equivalents.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fuel assembly comprising:
a plurality of fuel rods supported vertically; and
a channel box having a structure configured for advancement into a boiling-water reactor (BWR), the channel box surrounding the outer circumference of the plurality of fuel rods;
the fuel assembly having a plurality of regular dodecagon fuel rod arrangements, wherein a single fuel rod of the plurality of fuel rods is provided at each apex of each regular dodecagon, wherein each side of the regular dodecagon has length A;
the plurality of regular dodecagon fuel rod arrangements being arranged in regular intervals respectively in a transverse direction and a longitudinal direction, the transverse direction perpendicular to the longitudinal direction;
a first two regular dodecagon fuel rod arrangements of the plurality of regular dodecagon fuel rod arrangements adjacent in the transverse direction and arranged with two opposing sides of the first two regular dodecagons in parallel and apart by a first distance mA, wherein m is a non-negative integer; and
a second two regular dodecagon fuel rod arrangements of the plurality of regular dodecagon fuel rod arrangements adjacent in the longitudinal direction and arranged with two opposing sides of the second two regular dodecagons in parallel and apart by a second distance nA, wherein n is a non-negative integer.

2. The fuel assembly according to claim 1,
wherein a diagonal line is formed from a first corner of the channel box to a second corner of the channel box, the second corner being a corner of the channel box furthest from the first corner, the first corner being a corner of the channel box closest to a control rod;
wherein either the transverse direction or the longitudinal direction is parallel to the diagonal line; and
wherein the plurality of regular dodecagon fuel rod arrangements are arranged symmetrically against the diagonal line.

3. The fuel assembly according to claim 2,
wherein a row of the plurality of regular dodecagon fuel rod arrangements is aligned in either the transverse direction or the longitudinal direction on the diagonal line.

4. The fuel assembly according to claim 2,
wherein rows of the plurality of regular dodecagon fuel rod arrangements are aligned in either the transverse direction or the longitudinal direction and arranged symmetrically sandwiching the diagonal line.

5. The fuel assembly according to claim 1,
wherein either the transverse direction or the longitudinal direction is substantially parallel to a side of the channel box; and
wherein the plurality of regular dodecagon fuel rod arrangements are arranged symmetrically against a diagonal line, the diagonal line connecting a corner of the channel box closest to a control rod and a diagonal corner of the channel box furthest from the corner of the channel box closest to a control rod.

6. The fuel assembly according to claim 5,
wherein the plurality of regular dodecagon fuel rod arrangements are further arranged symmetrically against a line connecting midpoints of opposing sides of the channel box.

7. The fuel assembly according to claim 1,
wherein at least one of the plurality of regular dodecagon fuel rod arrangements includes, at the inside thereof, a regular hexagon fuel rod arrangement in which a single fuel rod of the plurality of fuel rods is provided at each apex of the regular hexagon; and
wherein each side of the regular hexagon has length A, and each side of the regular hexagon is parallel to a corresponding side of the regular dodecagon.

8. The fuel assembly according to claim 7,
wherein the regular hexagon fuel rod arrangement includes a fuel rod of the plurality of fuel rods at the center of the regular hexagon.

9. The fuel assembly according to claim 1,
wherein at least one of the plurality of regular dodecagon fuel rod arrangements includes, at the inside thereof, a regular tetragon fuel rod arrangement in which a single fuel rod of the plurality of fuel rods is provided at each apex of the regular tetragon; and
wherein each apex of the regular tetragon is located at a vertex of a regular triangle, the regular triangle having as the base one of every three sides of the regular dodecagon.

10. The fuel assembly according to claim 9,
wherein the regular tetragon fuel rod arrangement includes a fuel rod of the plurality of fuel rods at the center of the regular tetragon.

* * * * *